US010617942B2

(12) United States Patent
Holz et al.

(10) Patent No.: US 10,617,942 B2
(45) Date of Patent: Apr. 14, 2020

(54) CONTROLLER WITH HAPTIC FEEDBACK

(71) Applicant: Microsoft Technology Licensing, LLC, Redmond, WA (US)

(72) Inventors: Christian Holz, Seattle, WA (US); Eyal Ofek, Redmond, WA (US); Michael Jack Sinclair, Kirkland, WA (US); Hrvoje Benko, Seattle, WA (US); Inrak Choi, Stanford, CA (US); Eric Whitmire, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 15/859,095

(22) Filed: Dec. 29, 2017

(65) Prior Publication Data

US 2019/0201784 A1 Jul. 4, 2019

(51) Int. Cl.
*A63F 13/28* (2014.01)
*G06F 3/01* (2006.01)
(Continued)

(52) U.S. Cl.
CPC ............ *A63F 13/28* (2014.09); *A63F 13/245* (2014.09); *G06F 3/011* (2013.01); *G06F 3/014* (2013.01);
(Continued)

(58) Field of Classification Search
CPC ........ G06F 3/016; G06F 3/017; G06F 3/0346; G06F 3/03543; G06F 3/03547;
(Continued)

(56) References Cited

U.S. PATENT DOCUMENTS 7,182,691 B1 2/2007 Schena
9,727,076 B2 * 8/2017 Smith .................... G05G 9/047
(Continued)

FOREIGN PATENT DOCUMENTS

EP 3234742 10/2017

OTHER PUBLICATIONS

"CyberGrasp", Retrieved From: https://www.upc.edu/sct/documents_equipament/d_184_id-485.pdf, Dec. 2007, 30 Pages.
(Continued)

*Primary Examiner* — Nelson M Rosario
(74) *Attorney, Agent, or Firm* — Klarquist Sparkman, LLP

(57) ABSTRACT

A controller is provided that can provide haptic feedback to a user by controlling a separation of a stationary portion and a moveable portion, such as a moveable arm, which can include one or more mounts for one or more of a user's fingers. A sensor can be included on the stationary portion to sense whether the user's thumb is proximate a thumb rest. Different haptic interaction modes can be set depending on whether the user's thumb is not proximate the sensor, such as a touch mode, or is proximate the sensor, such as a grasping or trigger mode. When grasping and trigger modes are provided, they can be determined based on the nature of a virtual object grasped by a user. Additional haptic sensations can be provided, such as to a user's fingertip, such as by a vibratory component or a rotatable object of one or more haptic elements.

20 Claims, 11 Drawing Sheets

(51) Int. Cl.
A63F 13/245 (2014.01)
G06F 3/0338 (2013.01)
G05G 9/047 (2006.01)
(52) U.S. Cl.
CPC ............ *G06F 3/016* (2013.01); *G06F 3/0338* (2013.01); *G05G 9/047* (2013.01); *G05G 2009/04766* (2013.01)
(58) Field of Classification Search
CPC ............... G06F 3/0485; G06F 3/04883; G06F 2203/0333; G06F 2203/0337; G06F 2203/0339; G06F 2203/04808; G06F 3/167; G06F 3/014; G06F 3/16; G06F 3/044; G06F 3/0414; G06F 3/0338; G06F 3/02; G06F 220/04108; G08C 23/04; G08C 2201/32; G02B 27/20; G06T 13/40; A63F 13/24
See application file for complete search history.

(56) References Cited

U.S. PATENT DOCUMENTS

| | | | |
|---|---|---|---|
| 2011/0219899 A1* | 9/2011 | Dize | G05G 9/047 74/471 XY |
| 2014/0116183 A1 | 5/2014 | Smith et al. | |
| 2016/0054797 A1 | 2/2016 | Tokubo et al. | |
| 2016/0162021 A1 | 6/2016 | Hirose et al. | |
| 2017/0212589 A1 | 7/2017 | Domenikos et al. | |
| 2017/0225337 A1 | 8/2017 | Schaible et al. | |
| 2017/0322626 A1 | 11/2017 | Hawkes et al. | |
| 2018/0356907 A1* | 12/2018 | Parazynski | G06F 3/0346 |

OTHER PUBLICATIONS

"CyberTouch", Retrieved From: http://www.cyberglovesystems.com/cybertouch/, Retrieved on: Oct. 26, 2017, 5 Pages.
"Dexta Robotics", Retrieved From: http://www.dextarobotics.com/, Retrieved on: Oct. 26, 2017, 6 Pages.
"EXOS Project", Retrieved From: http://exiii.jp/exos/, Retrieved on: Oct. 26, 2017, 16 Pages.
"Expression of 2DOF Fingertip Traction with 1DOF Lateral Skin Stretch", In International AsiaHaptics conference, Nov. 29, 2016, pp. 21-25.
"Feel the Virtual Reality", Retrieved From: http://hapto.me/, Retrieved on: Oct. 25, 2017, 2 Pages.
"FeeTech—Standard 15kg.cm Metal Gears Analog Servo FS5115M", Retrieved From: http://www.feetechrc.com/product/analog-servo/standard-15kg-cm-metal-gears-analog-servo-fs5115m/, Mar. 8, 2013, 4 Pages.
"Getting Started with Your Rock Band VR Connector", Retrieved From: https://www.youtube.com/watch?v=HIEkqmmSWoshttps://www.youtube.com/watch?v=HIEkqmmSWos, Retrieved on: Oct. 26, 2017, 2 Pages.
"Go Touch VR", Retrieved From: https://www.gotouchvr.com/, Retrieved on: Oct. 26, 2017, 6 Pages.
"HS-35HD Ultra Nano Servo", Retrieved From: http://hitecrcd.com/products/servos/micro-and-mini-servos/analog-micro-and-mini-servos/hs-35hd-ultra-nano-servo/product, Retrieved on: Oct. 26, 2017, 4 Pages.
"L12-R Micro Linear Servos for RC & Arduino", Retrieved From: https://www.actuonix.com/L12-R-Linear-Servo-For-Radio-Control-p/112-r.htm, Retrieved on: Oct. 26, 2017, 2 Pages.
"Novint", Retrieved From: http://www.novint.com/index.php/products/novintfalcon, Retrieved on: Oct. 26, 2017, 4 Pages.
"Oculus Rift", Retrieved From: https://www.oculus.com/rift/, Retrieved on: Oct. 26, 2017, 14 Pages.
"ProTubeVR", Retrieved From: https://www.protubevr.com/product-page/copie-de-protubevr-for-htc-vive-and-oculus-rift-inside-ue, Retrieved on: Oct. 26, 2017, 2 Pages.
"Teensy USB Development Board", Retrieved From: https://www.pjrc.com/teensy/index.html, Retrieved on: Oct. 26, 2017, 2 Pages.
"Vive", Retrieved From: https://www.vive.com/us/product/vive-virtual-reality-system/, Retrieved on: Oct. 26, 2017, 6 Pages.
Araujo, et al., "Snake Charmer: Physically Enabling Virtual Objects", In Proceedings of the Tenth International Conference on Tangible, Embedded, and Embodied Interaction, Feb. 14, 2016, pp. 218-226.
Azmandian, et al., "Haptic Retargeting: Dynamic Repurposing of Passive Haptics for Enhanced Virtual Reality Experiences", In Proceedings of the CHI Conference on Human Factors in Computing Systems, May 7, 2016, pp. 1968-1979.
Benko, et al., "NormalTouch and TextureTouch: High-fidelity 3D Haptic Shape Rendering on Handheld Virtual Reality Controllers", In Proceedings of the 29th Annual Symposium on User Interface Software and Technology, Oct. 16, 2016, pp. 717-728.
Blake, et al., "Haptic Glove with MR Brakes for Virtual Reality", In Journal of IEEE/ASME Transactions on Mechatronics, vol. 14, Issue 5, Oct. 1, 2009, pp. 606-615.
Bouzit, et al., "The Rutgers Master II-ND Force Feedback Glove", In Proceedings of the 10th Symposium on Haptic Interfaces for Virtual Environment and Teleoperator Systems, Mar. 24, 2002, 2 Pages.
Bouzit, et al., "The Rutgers Master II—New Design Force-Feedback Glove", In Proceedings of IEEE/ASME Transactions on Mechatronics, vol. 7, Issue 2, Jun. 2002, pp. 256-263.
Carter, et al., "UltraHaptics: Multi-Point Mid-Air Haptic Feedback for Touch Surfaces", In Proceedings of the 26th annual ACM symposium on User interface software and technology, Oct. 8, 2013, pp. 505-514.
Chan, et al., "Virtual Reality Simulation in Neurosurgery: Technologies and Evolution", In Journal of Neurosurgery, vol. 72, Issue 1, Jan. 1, 2013, 6 Pages.
Cheng, et al., "Design and Analysis of a Robust, Low-cost, Highly Articulated manipulator enabled by jamming of granular media", In Proceedings of IEEE International Conference on Robotics and Automation, May 14, 2012, 4 Pages.
Chinello, et al., "Design and development of a 3RRS wearable fingertip cutaneous device", In Proceedings of IEEE International Conference on Advanced Intelligent Mechatronics, Jul. 7, 2015, 6 Pages.
Choi, et al., "Grabity: A Wearable Haptic Interface for Simulating Weight and Grasping in Virtual Reality", In Proceedings of 30th Annual ACM Symposium on User Interface Software and Technology, Oct. 22, 2017, pp. 119-130.
Choi, et al., "Wolverine: A Wearable Haptic Interface for Grasping in Virtual Reality", In Proceedings of IEEE/RSJ International Conference on Intelligent Robots and Systems, Oct. 9, 2016, 4 Pages.
Choi, et al., "Wolverine: A Wearable Haptic Interface for Grasping in VR", In Proceedings of 29th Annual Symposium on User Interface Software and Technology, Oct. 16, 2016, 2 Pages.
Girard, et al., "HapTip: Displaying Haptic Shear Forces at the Fingertips for Multi-Finger Interaction in Virtual Environments", In Journal of Frontiers in ICT, vol. 3, Issue 6, Apr. 22, 2016, 12 Pages.
Guiard, Yves, "Asymmetric Division of Labor in Human Skilled Bimanual Action: The Kinematic Chain as a Model", In Journal of Motor Behavior, vol. 19, Issue 4, Dec. 1, 1987, 14 Pages.
Gupta, et al., "SqueezeBlock: using virtual springs in mobile devices for eyes-free interaction", In Proceedings of the 23nd annual ACM symposium on User interface software and technology, Oct. 3, 2010, pp. 101-104.
Khatib, et al., "Ocean One: A Robotic Avatar for Oceanic Discovery", In Journal of IEEE Robotics & Automation Magazine, vol. 23, Issue 4, Dec. 2016, 8 Pages.
Kim, et al., "Design of a tubular snake-like manipulator with stiffening capability by layer jamming", In Proceedings of IEEE International Conference on Intelligent Robots and Systems, Oct. 7, 2012, 4 Pages.
Konishi, et al., "Synesthesia suit: the full body immersive experience", In Journal of ACM SIGGRAPH Posters, Article 71, Jul. 24, 2016, 1 Page.

(56) References Cited

OTHER PUBLICATIONS

Krishna, Swapna, "Valve's 'Knuckles' VR controller tracks individual fingers", Retrieved From: https://www.engadget.com/2017/06/22/valve-knuckles-vr-individual-finger-tracking/, Jun. 22, 2017, 8 Pages.
Kron, et al., "Disposal of explosive ordnances by use of a bimanual haptic telepresence system", In Proceedings of IEEE International Conference on Robotics and Automation, Apr. 26, 2004, 4 Pages.
Krusteva, et al., "Marionette: a Multi-Finger Tilt Feedback Device for Curvatures and Haptic Images Perception", In Proceedings of the 33rd Annual ACM Conference Extended Abstracts on Human Factors in Computing Systems, Apr. 18, 2015, pp. 1229-1234.
Kuchenbecker, et al., "The Touch Thimble: Providing Fingertip Contact Feedback During Point-Force Haptic Interaction", In Proceedings of IEEE Symposium on Haptic Interfaces for Virtual Environment and Teleoperator Systems, Mar. 13, 2008, 4 Pages.
Lee, et al., "Funneling and saltation effects for tactile interaction with virtual objects", In Proceedings of the SIGCHI Conference on Human Factors in Computing Systems, May 5, 2012, pp. 3141-3148.
Liss, et al., "Robotic Surgical Simulation", In Cancer Journal, vol. 19, Issue 2, Mar. 2013, pp. 124-129.
Manti, et al., "Stiffening in Soft Robotics: A Review of the State of the Art", In Journal of IEEE Robotics & Automation Magazine, vol. 23, Issue 3, Sep. 13, 2016, 14 Pages.
Massie, et al., "The PHANToM Haptic Interface: A Device for Probing Virtual Objects", In Proceedings of the ASME Winter Annual Meeting, Symposium on Haptic Interfaces for Virtual Environment and Teleoperator Systems vol. 55, Issue 1, Nov. 20, 1994, pp. 1-6.
Itsuda, et al., "Wearable haptic display by the use of a Particle Mechanical Constraint", In Proceedings of 10th Symposium on Haptic Interfaces for Virtual Environment and Teleoperator Systems, Mar. 24, 2002, 12 Pages.
Nakagawa, et al., "MimicTile: a variable stiffness deformable user interface for mobile devices", In Proceedings of the SIGCHI Conference on Human Factors in Computing Systems, May 5, 2012, pp. 745-748.
Pacchierotti, et al., "The hRing: A wearable haptic device to avoid occlusions in hand tracking", In Proceedings of IEEE Haptics Symposium, Apr. 8, 2016, 4 Pages.
Pacchierotti, et al., "Wearable Haptic Systems for the Fingertip and the Hand: Taxonomy, Review, and Perspectives", In Journal of IEEE Transactions on Haptics, May 9, 2017, pp. 1-23.
"International Search Report & Written Opinion Issued in PCT Application No. PCT/US18/065311", dated Mar. 1, 2019, 15 Pages. (MS# 403309-WO-PCT).
Peer, et al., "A New Admittance-Type Haptic Interface for Bimanual Manipulations", In Journal of IEEE/ASME Transactions on Mechatronics, vol. 13, No. 4, Aug. 2008, pp. 416-428.
Perez, et al., "Soft Finger Tactile Rendering for Wearable Haptics", In Proceedings of IEEE World Haptics Conference, Jun. 22, 2015, 6 Pages.
Prattichizzo, et al., "Towards Wearability in Fingertip Haptics: A 3-DoF Wearable Device for Cutaneous Force Feedback", In Journal of IEEE Transactions on Haptics, vol. 6, Issue 4, Oct. 2013, pp. 1-12.
Raisamo, Jukka, "Vibrotactile Movement and Its Applications for Virtual Reality", In Proceedings of 2nd IEEE VR Workshop on Perceptual Illusions in Virtual Environments, Mar. 21, 2010, pp. 25-28.

Santiago, et al., "Soft Robots and Kangaroo Tails: Modulating Compliance in Continuum Structures Through Mechanical Layer Jamming", In Journal of Soft Robotics, vol. 3, No. 2, Jun. 13, 2016, pp. 54-63.
Scheibe, et al., "Tactile Feedback at the Finger Tips for Improved Direct Interaction in Immersive Environments", In Proceedings of IEEE Symposium on 3D User Interfaces, Mar. 10, 2007, 7 Pages.
Schorr, et al., "Fingertip Tactile Devices for Virtual Object Manipulation and Exploration", In Proceedings of the CHI Conference on Human Factors in Computing Systems, May 2, 2017, pp. 3115-3119.
Simon, et al., "Wearable jamming mitten for virtual environment haptics", In Proceedings of the ACM International Symposium on Wearable Computers, Sep. 13, 2014, pp. 67-70.
Solazzi, et al., "Design of a novel finger haptic interface for contact and orientation display", In Proceedings of IEEE Haptics Symposium, Mar. 25, 2010.
Steins, et al., "Imaginary devices: gesture-based interaction mimicking traditional input devices", In Proceedings of the 15th international conference on Human-computer interaction with mobile devices and services, Aug. 27, 2013, pp. 123-126.
Talvas, et al., "3D Interaction Techniques for Bimanual Haptics in Virtual Environments", In Publication of Springer—Multi-finger Haptic Interaction, Jun. 2013, pp. 1-22.
Tsetserukou, Dzmitry, "FlexTorque, FlexTensor, and HapticEye: exoskeleton haptic interfaces for augmented interaction", In Proceedings of the 2nd Augmented Human International Conference, Mar. 12, 2011, 2 Pages.
Van Der Linde, et al., "The HapticMaster, a new high-performance haptic interface", In Proceedings of Eurohaptics, Jul. 8, 2002, pp. 1-5.
Vanderborght, et al., "Variable impedance actuators: A review", In Journal of Robotics and Autonomous Systems, vol. 61, Issue 12, Dec. 2013, pp. 1601-1614.
Verplank, et al., "The Plank: designing a simple haptic controller", In Proceedings of the Conference on New Instruments for Musical Expression, May 24, 2002, pp. 1-4.
Wei, et al., "A soft robotic spine with tunable stiffness based on integrated ball joint and particle jamming", In Journal of Mechatronics, vol. 33, Feb. 29, 2016, pp. 84-92.
Wijntjes, et al., "Local Surface Orientation Dominates Haptic Curvature Discrimination", In Journal of IEEE Transactions on Haptics, vol. 2, Issue 2, Apr. 2009, pp. 94-102.
William, R Provancher., "Creating greater VR immersion by emulating force feedback with ungrounded tactile feedback", In IQT Quarterly, vol. 6, No. 2, 2014, pp. 18-21.
Yamaguchi, et al., "A Non-grounded and Encountered-type Haptic Display Using a Drone", In Proceedings of the Symposium on Spatial User Interaction, Oct. 15, 2016, pp. 43-46.
Yano, et al., "Shape and friction recognition of 3D virtual objects by using 2-DOF indirect haptic interface", In Proceedings of IEEE World Haptics Conference, Jun. 22, 2015.
Yem, et al., "Wearable tactile device using mechanical and electrical stimulation for fingertip interaction with virtual world", In Proceedings of IEEE Virtual Reality, Mar. 18, 2017, pp. 90-104.
Zenner, et al., "Shifty: A Weight-Shifting Dynamic Passive Haptic Proxy to Enhance Object Perception in Virtual Reality", In Journal of IEEE Transactions on Visualization and Computer Graphics, vol. 23, Issue 4, Apr. 2017, 6 Pages.

* cited by examiner

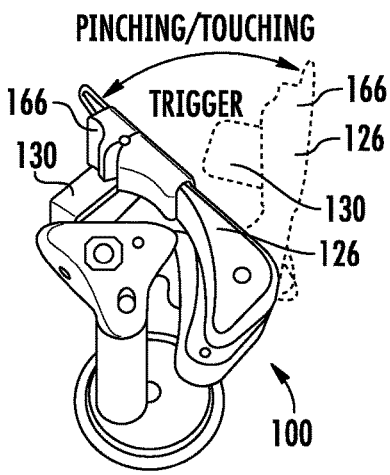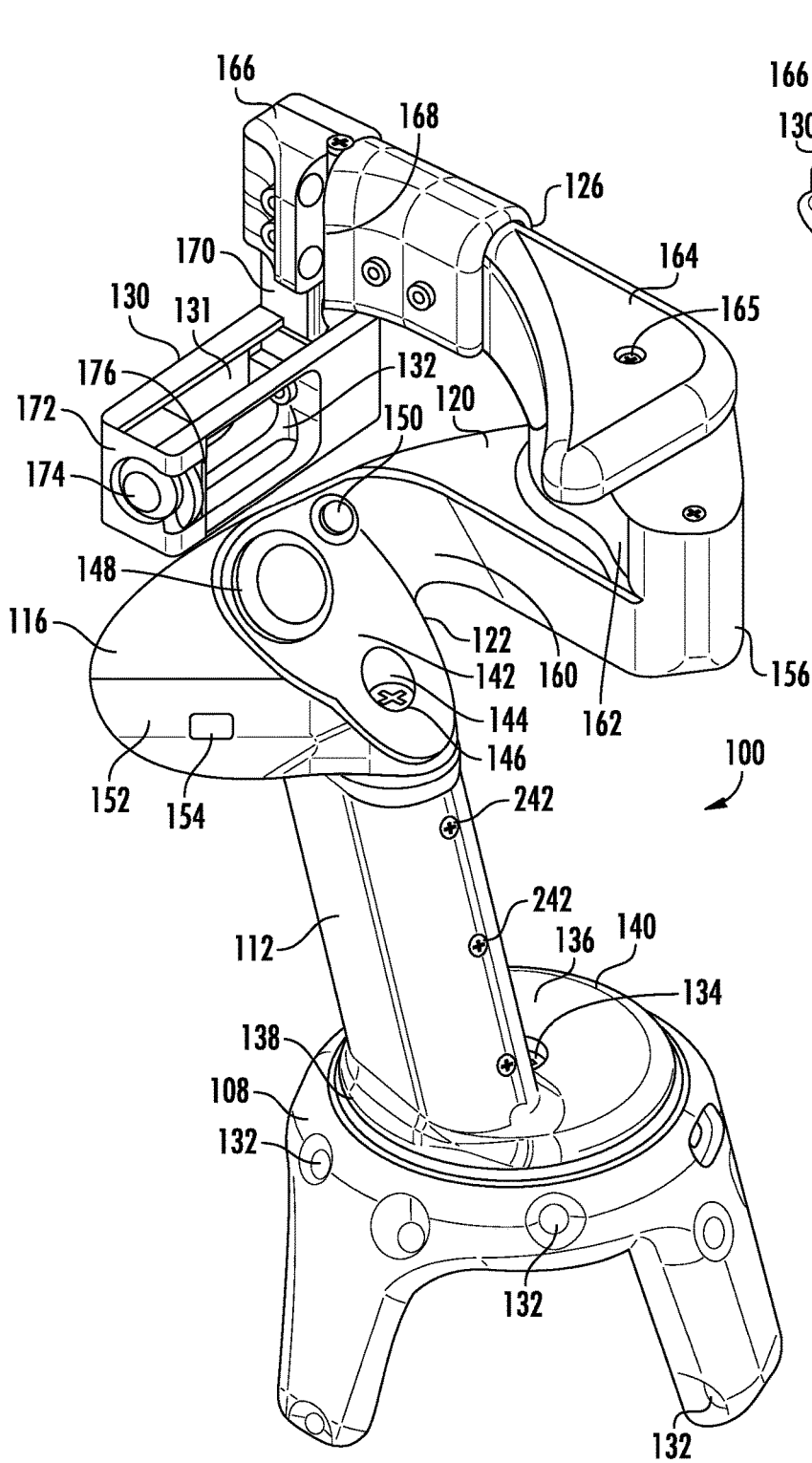
FIG. 1B
FIG. 1A

CONTROLLER WITH HAPTIC FEEDBACK

BACKGROUND

Computer-generated environments for human interaction are becoming ever more complex and realistic. These environments have moved beyond presenting limited environmental details on a fixed two-dimensional surfaces, such as a computer monitor or television screen, to head-mounted displays that can present a user with an immersive, completely computer-rendered experience, sometimes referred to as "virtual reality," or selectively overlaying computer-generated images on analog-world image viewable by a user through visors capable of transparently allowing ambient light to reach the user's eyes, sometimes referred to as "augmented reality."

Virtual and augmented reality systems (collectively referred to as computer-generated environments) can allow a user to interact with a fully or partially simulated environment in a variety of manners that typically are more engaging and complex than traditional interactions, such as video games. For example, a user may be allowed to freely move and look about an environment, rather than being constrained by software-imposed environmental limitations, such as only having certain a certain horizontal or vertical range of an environment available for a user to view. Virtual and augmented reality systems typically relax or remove these kinds of restrictions.

The sense of immersion can be greatly enhanced by display visors occupying a user's entire field of vision, such that the user is never removed from the computer-generated or enhanced environment. For traditional fixed, two-dimensional displays, if the user turns their head, or the viewing device occupies a sufficiently small portion of their field of vision, the user can be interrupted from their experience. In contrast, with typical virtual and augmented reality display devices, the computer-generated environment can be maintained no matter where the viewer chooses to direct their gaze.

Advances in hardware and software have reached a stage where the visual and audio experience provided by virtual and augmented reality systems can be very convincing. While high-end gaming consoles and dedicated virtual/augmented reality systems can present exceedingly realistic visual and audio content to a user, even comparatively simple devices, such as smartphones, can be adapted to present surprisingly immersive environments to a user, such as by inserting a smartphone into a specialized holder that places the device screen in sufficient proximity to a user that it occupies a substantial portion of the user's field of vision. However, devices that allow a user to interact with computer-generated environments, including receiving tactile/haptic feedback, have not reached the same level of refinement as the audio and visual content.

User interaction with a computer-generated environment can be of several types. One type of interaction modality can involve the user traversing a computer-generated environment. For example, in a simulated analog world situation, how are changes in the positions of the user's body, such as the position of the user's head (such as to determine where the user is looking, and thus what should be visually or audibly rendered) determined and translated into corresponding, realistic environmental changes in the simulated environment? If a user wishes to move within an environment, how can this input be provided?

Haptic interaction is another type of user interaction that is typically of interest in virtual and augmented reality environments. For example, if a user touches a rendered object, the system should be able to detect the interaction, and provide realistic audio, visual, and haptic feedback to the user. In hitting a baseball in the real word, for instance, the user would see the ball hit the bat, see the trajectory of the ball altered as a result, hear the interaction of the bat with the ball, and receive haptic feedback for a variety of sensations, including the physical presence of the bat in the user's hand, the texture of the bat, and the impact of the bat with the ball. The more of these sensations that can be realistically conveyed to the user in a computer-generated environment, the more realistic and immersive it will be. Correspondingly, each element of a computer-generated environment that does not match with a user's expectation of a corresponding analog-world situation can disrupt the immersivity of the computer-generated environment.

To date, haptic devices typically suffer from a number of disadvantages, including providing a specific, limited type of haptic feedback, being expensive to build, providing obvious but unnatural behavior, and being cumbersome for the user to out on and take off. Proposed hand-held or hand-worn haptic devices include exoskeleton hand gloves for grasping, fingertip devices for rendering shear force and weight, vibrotactile devices for rendering textures, controller type devices for touching, and exoskeleton haptic suits for kinesthetic feedback to the entire arms. Devices such as exoskeleton gloves or suits, in addition to their complexity and expense, can be cumbersome for a user to put on and take off. For example, even getting a first glove on can be difficult, getting a second glove on can be even more frustrating for users, since they do not have an ungloved hand to use. Difficulty in putting on and taking off devices can be particularly problematic if a user needs to rapidly switch to a different modality in the computer-generated environment, or to deal with a situation in the analog world (e.g., answer the door or a phone call). Accordingly, room for improvement exists in the design of haptic devices for use in virtual and augmented reality scenarios.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for providing haptic feedback to a user corresponding to events in a computer-generated environment, as well as determining a haptic interaction mode intended by a user. A controller is provided that can provide haptic feedback to a user by controlling a separation of a stationary portion, one or more portions of which may be configured to receive a user's thumb according to a particular interaction mode, and a moveable portion, such as a moveable arm, which can include one or more mounts for one or more of a user's fingers. A sensor can be included on the stationary portion to sense whether the user's thumb is proximate. Different haptic interaction modes can be set depending on whether the user's thumb is not proximate the sensor, such as a touch mode, or is proximate the sensor, such as a grasping or trigger mode. When grasping and trigger modes are provided, they can be determined based on the nature of a virtual object grasped by a user. Additional haptic sensations can be provided, such as to a user's fingertip, such as by a vibratory component or a wheel of one or more haptic elements.

According to an embodiment, a controller for a computing device is provided that includes a stationary member having an inner surface and an outer surface. The inner surface is configured to receive a user's thumb. A movable arm is pivotably coupled to the outer surface of the stationary member. A mount is configured to receive one or more fingers of a user. The controller includes a processor configured to receive communications from a remote computing device to set a position of the movable arm relative to the stationary member. An actuator is coupled to the movable arm and configured to move the moveable arm relative to the stationary member in accordance with commands provided by the processor.

In some implementations, the stationary member includes a sensor disposed on the inner surface and configured to sense whether the user's thumb is proximate the sensor. The controller can also include one or more input elements, such as a buttons or analog sticks. The controller can include a positional tracking member, such as a member capable of six-degree of freedom tracking. The controller can include additional haptic feedback elements, such as a voice actuator coil or a wheel of one or more haptic elements that can be placed into contact with at least one of the user's fingers. In some aspects, the controller can include a force sensor configured to sense an amount of force provided by one or more of the user's fingers on the mount.

In another embodiment, one or more rotatable objects or members, such as discs or wheels, are provided that include one or more haptic elements. In a particular implementation, a rotatable object can include multiple, different haptic elements that can be selectively placed into contact with a user's finger. A rotatable object can be disposed at the end of a shaft that includes a finger mount for one or more of the user's fingers. The shaft can include one or more actuators, which can be configured to rotate the object and, optionally, translate the object towards and away from a user's finger as well as translate the rotatable object such that any angle of shear movement against the fingertip can be realized. When multiple haptic elements are included on a rotatable object, in some cases, haptic elements can be disposed in multiple circumferential lines of an outer surface of the rotatable object.

In another embodiment, a method is provided for providing haptic feedback to a user. It is detected that a user's thumb is proximate a sensor of a hardware user input device. A communication is sent to a remote computing device in communication with the hardware user input device indicating that the user's thumb is proximate the sensor. A communication is received from the remote computing device to actuate an actuator coupled to a moveable arm of the user input device to set a position of the moveable arm at a fixed distance from a stationary member of the user input device.

In a further embodiment of a method for providing haptic feedback to a user, it is detected that contact has been made between a virtual representation of at least a portion of a user's hand and an object rendered in a computer-generated environment. A separation is determined between the user's thumb and one or more of the user's fingers resulting from the detected contact. A communication is sent to a hardware controller to set a distance between a moveable arm of the hardware controller and a stationary arm of the hardware controller corresponding to the determined separation.

The present disclosure also includes computing systems and computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 1A is a perspective view of an example controller configured to provide haptic feedback, according to an embodiment of the disclosed technologies.

FIG. 1B is a perspective view of the controller of FIG. 1, illustrating how the controller can be manipulated between a pinching, touching, and trigger modes.

DETAILED DESCRIPTION

Overview

Figure 2:
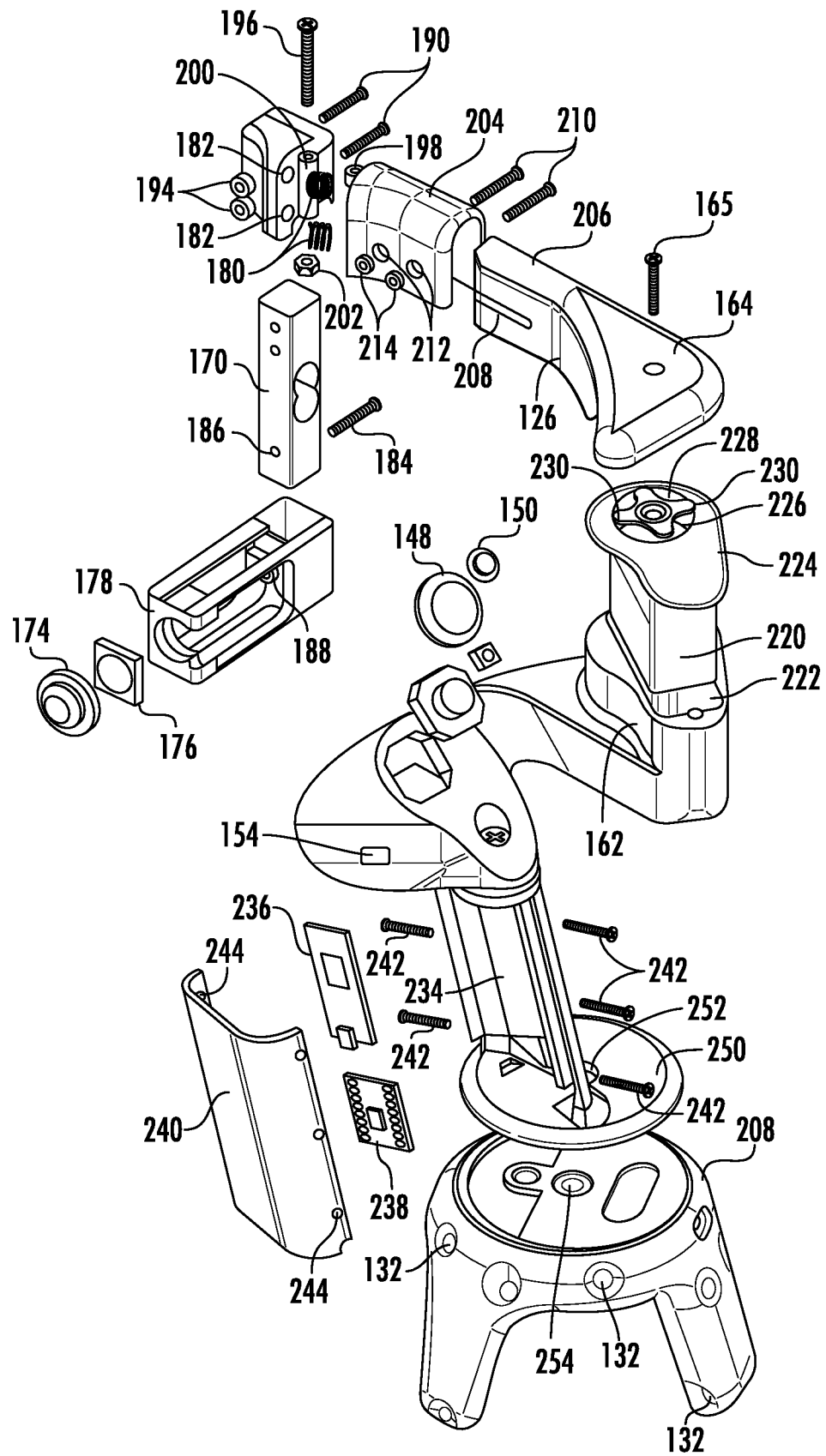
FIG. 2 is a perspective, exploded view of the controller of FIG. 1.

Computer-generated environments for human interaction are becoming ever more complex and realistic. These environments have moved beyond presenting limited environmental details on a fixed two-dimensional surfaces, such as a computer monitor or television screen, to head-mounted displays that can present a user with an immersive, completely computer-rendered experience, sometimes referred to as "virtual reality," or selectively overlaying computer-generated images on analog-world image viewable by a user through visors capable of transparently allowing ambient light to reach the user's eyes, sometimes referred to as "augmented reality."

Virtual and augmented reality systems (collectively referred to as computer-generated environments) can allow a user to interact with a fully or partially simulated environment in a variety of manners that typically are more engaging and complex than traditional interactions, such as video games. For example, a user may be allowed to freely move and look about an environment, rather than being constrained by software-imposed environmental limitations, such as only having certain a certain horizontal or vertical range of an environment available for a user to view. Virtual and augmented reality systems typically relax or remove these kinds of restrictions.

The sense of immersion can be greatly enhanced by display visors occupying a user's entire field of vision, such that the user is never removed from the computer-generated or enhanced environment. For traditional fixed, two-dimensional displays, if the user turns their head, or the viewing device occupies a sufficiently small portion of their field of vision, the user can be interrupted from their experience. In contrast, with typical virtual and augmented reality display devices, the computer-generated environment can be maintained no matter where the viewer chooses to direct their gaze.

Advances in hardware and software have reached a stage where the visual and audio experience provided by virtual and augmented reality systems can be very convincing. While high-end gaming consoles and dedicated virtual/augmented reality systems can present exceedingly realistic visual and audio content to a user, even comparatively simple devices, such as smartphones, can be adapted to present surprisingly immersive environments to a user, such as by inserting a smartphone into a specialized holder that places the device screen in sufficient proximity to a user that it occupies a substantial portion of the user's field of vision. However, devices that allow a user to interact with computer-generated environments, including receiving tactile/haptic feedback, have not reached the same level of refinement as the audio and visual content.

User interaction with a computer-generated environment can be of several types. One type of interaction modality can involve the user traversing a computer-generated environment. For example, in a simulated analog world situation, how are changes in the positions of the user's body, such as the position of the user's head (such as to determine where the user is looking, and thus what should be visually or audibly rendered) determined and translated into corresponding, realistic environmental changes in the simulated environment? If a user wishes to move within an environment, how can this input be provided?

Haptic interaction is another type of user interaction that is typically of interest in virtual and augmented reality environments. For example, if a user touches a rendered object, the system should be able to detect the interaction, and provide realistic audio, visual, and haptic feedback to the user. In hitting a baseball in the real word, for instance, the user would see the ball hit the bat, see the trajectory of the ball altered as a result, hear the interaction of the bat with the ball, and receive haptic feedback for a variety of sensations, including the physical presence of the bat in the user's hand, the texture of the bat, and the impact of the bat with the ball. The more of these sensations that can be realistically conveyed to the user in a computer-generated environment, the more realistic and immersive it will be. Correspondingly, each element of a computer-generated environment that does not match with a user's expectation of a corresponding analog-world situation can disrupt the immersivity of the computer-generated environment.

To date, haptic devices typically suffer from a number of disadvantages, including providing a specific, limited type of haptic feedback, lacking ability to exert human-scale forces, being expensive to build, exhibiting unnatural behavior and being cumbersome for the user to out on and take off. Proposed hand-held or hand-worn haptic devices include exoskeleton hand gloves for grasping, fingertip devices for rendering shear force and weight, vibrotactile devices for rendering textures, controller type devices for touching, and exoskeleton haptic suits for kinesthetic feedback to the entire arms. Devices such as exoskeleton gloves or suits, in addition to their complexity and expense, can be cumbersome for a user to put on and take off. For example, even getting a first glove on can be difficult, getting a second glove on can be even more frustrating for users, since they do not have an ungloved hand to use. Difficulty in putting on and taking off devices can be particularly problematic if a user needs to rapidly switch to a different modality in the computer-generated environment, or to deal with a situation in the analog world (e.g., answer the door or a phone call). Accordingly, room for improvement exists in the design of haptic devices for use in virtual and augmented reality scenarios.

In one aspect, the present disclosure provides a controller that employs an actuator to control a separation between a moveable arm having one or more mounts configured to receive one or more of a user's fingers and a stationary member against which a user's thump is configured to rest, at least in certain interaction modalities. In particular implementations, the controller can allow a user to switch between different interaction modes, such as a touch mode, a grasping mode, and optionally a trigger mode.

In another aspect, the present disclosure provides a haptic controller that can provide a user with multiple haptic sensations to render multiple types of forces to a user's hand and fingers. In another aspect, the present disclosure provides a haptic controller than is easy for a user to put on and take off.

In a further aspect, the present disclosure provides a haptic controller that supports a plurality of interaction modes, where an interaction mode can be determined from the position of a user's hand, such as the position of the user's thumb relative to a location on the controller. According to another aspect, one or more elements of a haptic controller can change interaction modalities based on the position of a user's hand, such as the position of the user's thumb, relative to a location on the controller, and a scenario of the computer-generated object. For example, when a user's hand is in a first position, the controller can provide a touching modality. When the user's hand is in a second position, the controller can provide a trigger modality if the user is grasping a triggered weapon in the computer-generated environment, and a grasping modality if the user is grasping another type of object.

Thus, at least certain disclosed haptic controllers can automatically transition between interaction modalities based on detecting the position of the user's hand, and optionally the type of scenario being rendered to the user. This automatic transitioning can increase the immersivity of a computer-generated environment, as the controller can both facilitate natural interaction mechanisms, and can do so without requiring an explicit command from the user (e.g., activating a switch or button, which may make the interaction more artificial, hence reducing the immersivity of the experience).

According to another aspect, technologies are provided that employ a haptic disc or wheel, having one or more haptic elements, to render shear force to one or more of the user's fingers. When the disc or wheel includes multiple haptic elements, the disc or wheel can be rotated such that a selected haptic element can be brought into contact with one or more of the user's fingers.

Example Controller

FIG. 1A is a perspective view of an example controller 100 according to an embodiment of the present disclosure. A perspective, exploded view of the controller 100 is shown in FIG. 2.

The controller 100 includes a base 108, a shaft 112 extending generally axially from the base 108, a head portion 116 extending from the top of the shaft 112, an arm mount 120 extending laterally from the outer side 122 of the head portion 116, a movable arm 126 positioned above, and pivotably coupled to, the arm mount 120, and a finger mount 130 extending downwardly from the movable arm 126. One or more of the shaft 122, head portion 116, and arm mount 120 can constitute a stationary portion of the controller, where the moveable arm 126 is moveable relative to the stationary portion.

The base 108 can include a tracking member that can provide for positional tracking of the controller 100, such as a 6-degree of freedom tracker. In the specific example of FIG. 1, the controller 100 can include a plurality of positional sensors 132 that can determine the position, including the vertical and horizontal positions (left/right and forward/back) of the base 108 (and, correspondingly, the remaining portions of the controller 100), and tilt information (yaw, roll, pitch) of the base relative to another surface (e.g., the floor or the ground). Although a particular number and distribution of sensors 132 is shown, in other cases, a different number of sensors can be included, or the sensors distributed in another manner.

In some cases, the positional sensors 132 can detect radiation, such as infrared light or visible light, from a reference point or base station in order to determine the position and orientation of the base 108 relative to the reference point. In a specific example, the base 108 can be constructed from an HTC VIVE controller (HTC Corp., New Taipei City, Taiwan). In other embodiments, positional and orientation tracking can be accomplished in another manner, such as using accelerometers and magnetometers to determine device orientation and GNSS tracking or positional tracking using a camera, which can be configured to measure visible or infrared radiation. In a further embodiment, a camera can be used to track both the position and orientation of the base 108, without requiring the use of additional sensors.

The base 108 can be coupled to the shaft 112 using a fastener, such as a screw 134. In other embodiments the base 108 and the shaft 112 can be integrally formed, or secured together in another manner, such as using an adhesive or welding. The shaft 112 can extend from the base 108 at an angle, such as being pitched forward relative to the central axis of the base. Being disposed at an angle relative to the base 108 can make the shaft 112 more comfortable for a user to grip. Similarly, the shaft 112 can extend from various positions on the upper face 136 of the base 108. That is, the shaft 112 can extend from the center of the face 136, or it can be disposed towards one edge of the face. In a particular example, and as shown, the shaft can be disposed between the center of the face 136 and the inner radial edge 138 of the face. Being positioned toward the inner radial edge 138 of the face 136 can make the controller 100 more comfortable for a user to hold, as the outer edge of the user's hand can rest on the outer edge 140 of the base when the user grips the shaft 112 in the user's palm.

The head portion 116 can have a face 142 that is generally triangular, with rounded corners. A lower portion of the face 142 can be narrower than an upper portion of the face, with the sides of the face tapering between the upper and lower portions. The face 142 can define a recess 144 for receiving a fastener, such as a screw 146, for securing the head portion 116 to the shaft 112. In other implementations, the head portion 116 can be secured to the shaft 112 in another manner, such as using an adhesive or by welding, or the head and shaft can be of unitary construction (e.g., a single piece of plastic).

One or more user input elements can be disposed in or on the face 142. For example, the face 142 is shown an including an analog stick element 148 (e.g., a joystick or thumb stick) configured to be operated by a user's thumb. The analog stick element 148 can allow a user to provide input to navigate through a computer-generated environment (such as to more easily or quickly traverse "long" distances in a computer generated environment than would be feasible through, for example, walking about an area mapped to a computer rendered environment and using the sensors 132), or to otherwise provide input to a computing device (such as by acting as a pointing device, where a user can select menus, menu items, or other user interface elements). Additional input elements, such as a button 150, can be provided to allow a user to provide additional types of input, such as to click or select items, or to perform other types of actions or provide other types of user input in a computer-generated environment, including to software controlling the computer-generated environment (e.g., to games, application, or operating system components associated with software rendering a computer-generated environment).

Although a single button 150 is shown, more buttons or other input elements could be provided, if desired. Similarly, additional analog stick elements 148 could be included on the controller 100. In yet further implementations, the analog stick element 148 and/or the button 150 can be omitted from the head portion 116. If desired, the head element 116 need not include any input devices for a user to actively provider user input.

An inner side 152 of the head portion 116 can function as a thumb rest. That is, when the user grips the shaft 112 and makes a grasping motion with their hand, the user's thumb can typically rest against the inner side 152. The inner side 152 can include a sensor 154, such as a proximity sensor configured to sense whether the user's thumb is proximate the sensor. In this way, the sensor 154 can be configured to detect whether the user's hand is in a grasping configuration or a different configuration that does not place the user's thumb proximate the sensor 154. The sensor 154 can be an optical (infrared) proximity sensor, such as the QRE1113 sensor, available from numerous sources, including www.digikey.com. Typically, a detection threshold is set such that when the light reflected back to a phototransistor exceeds a threshold the thumb is determined to be proximate the inner side 152, and not proximate the inner side 152 otherwise. However, if desired, more granular distinctions of thumb position may be set. Other types of sensors can be used for the sensor 154, such as capacitive sensors or sensors that detect other types of radiation (e.g., visible light, which can also be referred to as an optical sensor).

The arm mount 120 extends from the outer side 122 of the head portion 116. The arm mount 120 is generally arcuate, extending concavely such that the free end 156 of the arm mount extends further towards the rear portion (e.g., more proximal to the user) of the controller 100 than the shaft 112 or the head portion 116. The arm mount 120 can have a relatively narrow bridge portion 160 that connects to a housing portion 162 that is generally triangular with rounded corners. The housing portion 162 can be thicker than other portions of the arm mount 120 and may, for example, house other components of the controller 100, as described below, and provide a raised mounting surface for the moveable arm 126, such that the moveable arm does not impinge on the upper surface of the arm mount. The arm mount 120 and the housing portion 162 can be shaped differently than shown, and can be differently dimensioned, including having an arm mount that does not extend behind the shaft 112 or the head portion 116.

The movable arm 126 can be generally L-shaped, with the base 164 of the L being coupled to the housing portion 162 using a fastener 165. The stem of the L can extend distally to the housing portion 162, extending past the arcuate front edge of the arm mount 120 and the front side of the head portion 116. The base 164 of the L can have a narrower thickness that the stem. In some cases, the combined thickness of the housing portion 162 and the base of the L can be at least approximately the same as the thickness of the stem. In other cases, the thickness of the L can be the same throughout, or can vary in a different manner.

The movable arm 126 can include a pivotable member 166 that is coupled to a stationary portion 168 of the moveable arm. An upper end of a force sensor, such as a load cell 170, which can be the Phidgets CZL635 load cell (Phidgets, Inc., of Calgary, Canada), can be inserted into a receptacle formed in a lower portion of the pivotable member 166. A lower end of the load cell 170 can be received by a receptacle formed in the upper surface of the finger mount 130. The load cell 170, or another force sensor, can be coupled to an analog to digital converter (such as a HX711 ADC board, available from Avia Semiconductor, Inc., of Xiamen, China).

The finger mount 130 can be generally rectangular, with apertures 131, 132 formed in the front and rear faces of the finger mount, and through which a finger of the user, such as the index finger, can extend. The inner, free end 172 of the finger mount 130 can define an aperture or slot 178 (FIG. 2) for receiving a voice coil actuator 174 and a backing plate 176. The voice coil actuator 174 can be a generally disc or cylindrically shaped device. The voice coil actuator 174 can be positioned adjacent the slot 178 formed in free, inner lateral face of the finger mount 130. The slot 178 can have generally circular shape and can have a diameter smaller than the diameter of the voice coil actuator 174, such that the voice coil actuator does not pass through the slot. The backing plate 176 can be inserted behind the voice coil actuator 174 to retain the voice coil actuator in the finger mount 130. The voice coil actuator 174 can be coupled to a motor driver (now shown), such as the DRV8833 motor driver (available from Texas Instruments, Inc., of Dallas, Tex.).

FIG. 1B illustrates how the controller 100 can provide different haptic modalities using the movable arm 126 and its pivotable member 166. That is, by moving the movable arm 126 proximally and distally with respect to the head portion 116 and the shaft 112, the controller 100 can simulate a touching or grasping interaction by the user, as will be further explained below. The pivotable member 166 can also pivot to accommodate this motion by the user. The pivotable member 166 can also pivot, including more abruptly and/or to a higher degree, including while the movable arm 126 is maintained in a fixed position, such as to simulate the activation of a triggered weapon by the user.

The exploded view of FIG. 2 illustrates how the components of FIG. 1 may be assembled, as well as additional components that are not visible, or not as readily discerned, in FIG. 1. For example, FIG. 2 illustrates two springs 180 that may be inserted into respective mounting receptacles 182 of the pivotable member 166 and the stationary portion 168 (the mounting receptacles 182 of the stationary portion are not visible in FIG. 2) of the moveable arm 126. The springs 180 can be used to bias the pivotable member 166 towards the open, unbent position, which can help provide a more realistic triggering mechanism, as will be further described.

FIG. 2 also illustrates how the load cell 170 can be coupled to the finger mount 130 by inserting a fastener, such as screw 184 through a threaded bore 186 formed in the side of the load cell, through a mating bore in the finger mount, and retained by a nut 188. In turn, the upper end of the load cell 170 can be secured to the pivotable member 166 by inserting fasteners, such as screws 190, through apertures formed in the load cell, and into retaining nuts 194. The pivotable member 166 can be secured to the stationary end 168 of the movable arm 126 by inserting a fastener, such as a screw 196, through an annular projection 198 extending distally from the top of the stationary portion 168 and through the lumen of a cylindrical sleeve 200 formed on the proximal surface of the pivotable member, where it can then be received by a retaining nut 202.

FIG. 2 further illustrates that the movable arm 126 can include an outer member 204 that is slidable over an inner member 206 formed from the distal end of the stem of the L-shaped movable arm 126. The inner member 206 can include a slot 208 formed between the inner and outer faces of the inner member. The outer member 204 can be slid over the inner member 206 to varying degrees, allowing the length of the movable arm 126 to be adjusted, such as to better accommodate the particular size of a user's hand (including the length of their index finger). When the outer member 204 has been positioned as desired relative to the inner member 206, the outer member can be secured to the inner member by inserting fasteners 210 through apertures 212 in the outer member 204 and the slot 208 of the inner member, into retaining nuts 214.

FIG. 2 illustrates an actuator 220 disposed in a recess 222 formed in the housing portion 162. The actuator 220 can be configured to maintain the movable arm 126 at a distance (and angle) from the head portion 116 as directed by a computing device managing a computer-generated environment. Thus, among other modalities that will be further described, the actuator 220 can prevent a user from closing the distance between their thumb and index finger to simulate the resistance that would be encountered if a user grasped an object in the analog-world corresponding to an objected grasped in a computer-generated environment. In some cases, the actuator 220 can determine a position of the movable arm 126 when the position of the moveable arm is altered by a user (e.g., by pushing or pulling with the index finger and the countering force of the thumb), and can report the position, such as to a remote computing device managing a computer-generated environment.

Although various actuating devices can be used, in a particular example the actuator 220 is a servo motor, such as the Hitec HSB-9370TH servo motor (Hitec RCD USA, Inc., of Poway, Calif.). The recess 222 can be covered by a cover plate 224 having an aperture 226 through which a drive shaft and a drive wheel 228 of the actuator 220 can extend. The drive wheel 228 can have a plurality of perpendicularly disposed teeth 230 which can be received by mating recesses (not shown) formed in the bottom surface of the base 164.

The shaft 112 can include a recessed portion 234 formed in the inner side of the shaft. The recessed portion 234 can house various electronic or other components of the controller 100. For example, the recessed portion 234 can house a microcontroller 236 that can be used to interface with various electronic components of the controller, including the actuator 220, the analog stick element 148, and the button 150, and a remote computing device managing a computer-generated environment. The microcontroller 236, in a particular example, can be a Teensy 3.2 USB microcontroller PCB (available from www.digikey.com). Signals received from the load cell 170 can be initially processed by an analog to digital converter 238 (e.g., the HX711 ADC board) also housed in the recessed portion 234 and in communication with the microcontroller 236. A cover plate 240 can be secured over the recessed portion 234 by inserting fasteners, such as screws 242, through threaded apertures 244 formed in the sides of the cover plate 240.

The shaft 112, including the recessed portion 234 or another portion, can include additional components, if desired. For example, the shaft 112 can include a linear resonant actuator, or other device capable of imparting vibration to the shaft, that can vibrate the shaft to provide additional haptic feedback or sensations to the user (e.g., a "rumble motor," such as large, inexpensive motor having attached eccentric weights). A heating or cooling device (such as a Peltier device) can be included in the shaft 112 to provide thermal feedback or sensations to the user.

The shaft 112 can have a mounting plate 250 at its lower end. The mounting plate 250 can be mounted to the base 108 by inserting the fastener 134 through an aperture 252 formed in the mounting plate and a threaded bore 254 formed in the upper face of the base 108.

It will be appreciated that various changes can be made to the controller 100 without departing from the scope of the disclosed technologies. In particular, while the controller 100 has been described as including a finger mount 130 for the index finger, the controller can be adapted to receive multiple fingers. For example, the finger mount 130 can be dimensioned to receive a plurality of fingers, additional finger mounts can be included, or a combination thereof. When multiple finger mounts are included, the finger mounts can be actuated jointly (e.g., all finger mounts receive a common movement), independently (different degrees of actuation are provided for different mounts), or combinations thereof. In addition, the dimensions of the shaft 112 may be altered, or the shaft can be removed.

Typically, the controller 100 is provided as a unit that can be grasped and freely translated and rotated by a user (e.g., in six degrees of freedom). In some cases, the controller 100 can be wirelessly in communication with another computing device, such as a remote computing device managing a computer-generated environment, for example, over a network. In other cases, the controller can be connected to a remote computing device over a wired connection, such as a USB cable.

Haptic Interaction Modes

In various embodiments, disclosed haptic controllers can provide one or more haptic interaction modes. As described above, in at least some cases a haptic controller can provide feedback, such as via a proximity sensor, that can be used to determine whether a user intends a touching modality or a grasping or triggering modality, where software managing a computer-generated environment can select between a grasping or pinching mode and a trigger mode, such as based on a type associated with a virtual object being held by the user in the computer-generated environment.

Figure 3A:
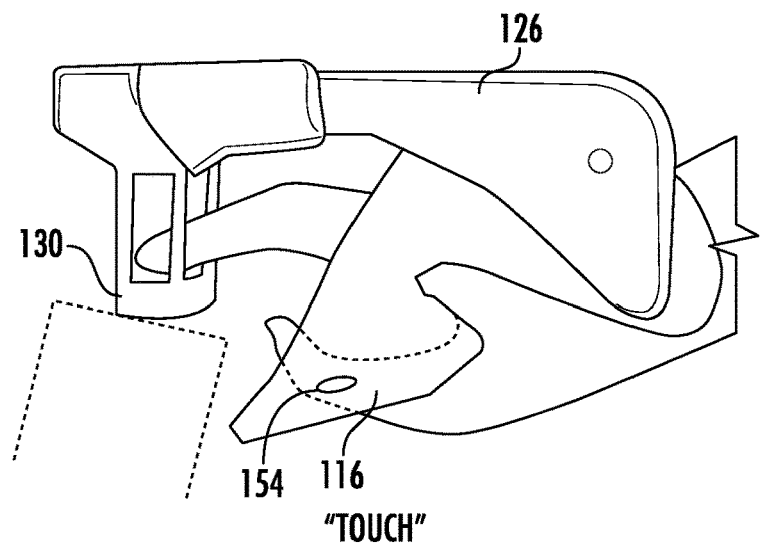
FIG. 3A illustrates the interaction of a user's hand with the controller of FIG. 1 when in a touch modality.
Figure 3B:
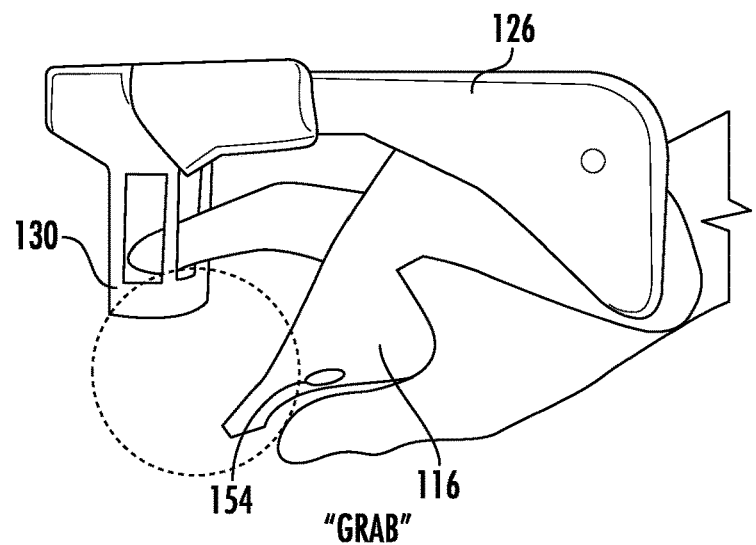
FIG. 3B illustrates the interaction of a user's hand with the controller of FIG. 1 when in a grasping or grabbing modality.
Figure 3C:
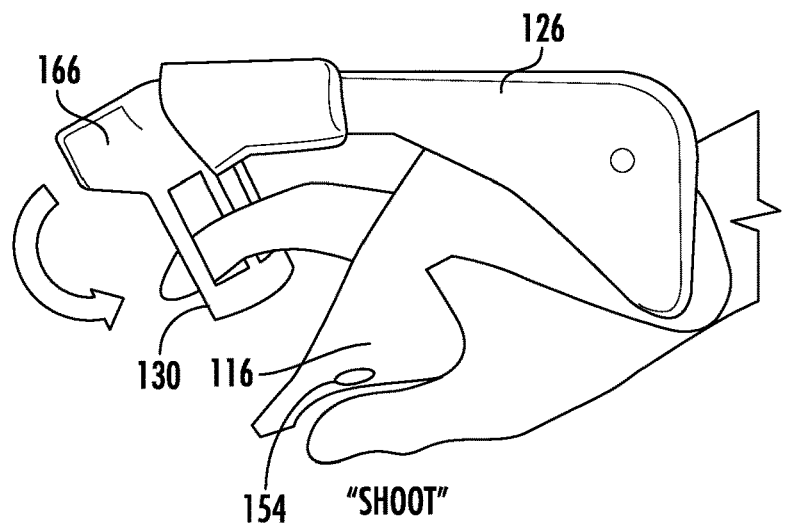
FIG. 3C illustrates the interaction of a user's hand with the controller of FIG. 1 when in a shooting or trigger modality.

Disclosed controllers, such as the controller 100, can provide for a grasping or pinching (prehensile) motions by a user. In use, a user can grip the controller 100 by inserting their index finger through the apertures 131, 132 of the finger mount 130, wrapping the remaining fingers about the shaft 112, and placing their thumb proximate the inner side 152 (when using a pinching, grasping, or triggering modality). Having the user's thumb on the inner side 152 can provide a counterforce to the user's index finger, as shown in FIGS. 3B, 3C.

As the user pinches or grasps a simulated object in a computer-generated environment (FIG. 3B), the position (angle relative to the shaft 112 or head portion 116) of, and resistance provided by, the moveable arm 126 can be controlled to simulate forces that would be experienced by the user if the object was pinched or grasped in the analog word. When users are in 'grasp' mode, which, in at least some cases, can be detected by the user's their thumb being sufficiently close to the proximity sensor 154, they can open and close their index finger freely (e.g., the actuator 220 of the movable arm 126 is not engaged/does not provide resistance to movement). Once the user grasps a virtual object, the actuator 220 engages to impede further motion of the moveable arm 126 in response to applied pressure by the user at the object's grasp width, rendering grasping forces based on the stiffness of the object.

As the user's simulated hand in the computer-generated environment contacts an object to be pinched or grasped, the resistance provided to the moveable arm 126 by the actuator 220 can be set so as to provide an analog-world force consistent with what the user would expect to experience based on the computer-generated environment. For example, if the user grasps an object, the moveable arm 126 can be prevented from further compression in accordance with the size of the simulated object (or a portion thereof) being grasped. Similarly, if an object is inserted into the user's hand in the computer-generated environment, or grows in size, the moveable arm 126 can expand to move the index finger and thumb further apart.

The resistance provided by the moveable arm 126 can also be used to simulate the physical properties of a simulated object. For example, for a simulated object that is "hard" (difficult to compress or rigid), the moveable arm 126 can prevent further compression once the user's grasp contacts the simulated object. If a simulated object is "soft", the resistance to further compression of the angle of the moveable arm 126 can increase (at least to a point) to simulate the user compressing the simulated object. For resilient objects, such as a simulated rubber ball, the moveable arm 126 can be configured to initially provide comparatively light resistance as the user compresses the simulated object, to increase the resistance with further compression, and to eventually provide an expansive force (opening up the angle between the user's thumb and index finger) as the object resists further compression, rebounds under its own resiliency. In a specific example, Hooke's law for spring behavior can be used to determine an amount of visual deformation to be rendered to a computer-generated environment for the grasped object, as well as rendering this spring behavior to the controller 100 by suitably actuating the moveable arm 126.

Although the above description references objects being grasped, the moveable arm 126 can be used to provide other haptic feedback to the user that is not specifically tied to grasping an object. For example, if the simulated environment involves the user experiencing a higher or lower viscosity than is provided by the ambient, analog-world environment of the user, the moveable arm 126 can provide a resistance to simulate the increased (or decreased) viscosity. If the user is in a simulated water environment, for example, the resistance provided by the moveable arm 126 can be increased to reflect the higher viscosity of water compared with air. In some cases, to provide more realistic grasping forces, force feedback (e.g., from the load cell 170) can be subject to a hysteresis effect, were pushing forces and recovering forces are not matched.

Although various methods can be used for determining whether a user in a computer-generated environment has grasped a rendered object, in a particular implementation, software managing the computer-generated environment can test for possible contacts below the thumb and index finger by checking for collisions against a ray originating at each (simulated) fingertip and pointed towards the opposing (simulated) finger. If each one of those rays intersects the same virtual object within a small tolerance buffer (1 cm) from the fingertip, the virtual object can be considered to be grabbed. From that point on, the position and orientation of the object can be rendered under kinematic control, until the ray no longer intersects the object, indicating that the user has dropped or released the object.

The controller 100 can also provide for a "touching," non-prehensile, haptic modality. In this case, when the user touches a surface that provides a degree of resistance in the simulated environment, the moveable arm 126 can change position or resistance accordingly. In one implementation, in the touch mode, a controller, such as the controller 100, places the movable arm 126 in a minimum (closed) position with respect to the shaft 112 or head portion 116 (FIG. 3A). In at least some cases, this position cannot be altered by the user through force input. When the user's hand is in position for the "touch modality" the user's thumb can rest again a front (or distal) portion of the head portion 116.

Once the controller 100 comes into contact with a virtual object, the moveable arm 126 is actuated so as to move the user's finger according to the amount of object penetration. As the user makes contact with virtual objects in a computer-generated environment, the controller can increase the angle between the movable arm 126 and the shaft 112 or head portion 116, to move the finger mount 130 and the user's index finger outwardly, keeping it on the boundary of the virtual surface in the same 3-dimensional position. For example, if a user bends a finder to touch an object, or an object touches the user, the movable arm 126 can be moved inwardly or outwardly in a corresponding manner. Similarly, if the user touches an object that provides resistance (such as a ball or sponge), the moveable arm 126 can be provided with increased resistance by the actuator 220.

In addition, the moveable arm 126 can be actuated to render normal forces based on the stiffness of the object. That is, as the user applies more force (such as sensed by the load cell 170), if the object is soft or compressible, the moveable arm 126 can move to reduce the angle between it and the shaft 112 or head portion 116. If the object is hard, the amount of force exerted by the user before movement of the movable arm 126 occurs can increase, or for sufficiently rigid objects, the moveable arm can retain its position regardless of the amount of force exerted by the user.

The moveable arm 126 can also be used to simulate objects contacting the outside of a user's hand or fingers. For example, if an object or surface in a computer-generated environment contacts the back of the user's index finger, the moveable arm 126 can move inwardly to simulate the object contacting the user.

The "touch mode" can be used to provide additional haptic sensations, such as a "clicking" action, which can simulate a clickable button. Force curves can be provided that provide a stiff elastic click as the user is simulated to push the button. Once a hysteresis threshold is reached, a lower spring force is encountered, causing a click sensation, as well as a lower return force, until a second hysteresis point is reached. Upon reaching the second hysteresis point, the initial, higher spring force is applied.

The pivotable member 166 can provide different haptic functions depending on the interaction modality. For example, for a touching or grasping motion, the pivotable member 166 can passively adjust to track the motion of the user's index finger. However, the pivotable member 166 can also be used to provide a trigger functionality, such as when the user is holding a simulated triggered weapon in the computer-generated environment.

If the object a user has picked up is a gun, such as determined by software managing a computer-generated environment, the controller enters 'trigger' mode and locks the moveable arm 126 in a fixed open position. At this point, users may only bend the pivotable member 166 to carry out a triggering movement, which, when above a threshold force (for example, 4 N), generates a quick back and forward motion from the actuator 220, simulating an automatic weapon, for haptic trigger feedback in addition to vibration feedback under the index finger (e.g., using the voice coil actuator 174). That is, the actuator 220 can quickly decrease the angle of the moveable arm 126, such as at its maximum speed. Concurrently, if a linear resonant actuator, or similar device, is included in the controller 100, such as in the shaft 112, it can turn on and vibrate the shaft.

Because the angle of the movable arm 126 decreases quickly, the user's trigger force drops below the threshold (e.g., the 4 N threshold), resetting the arm to the original position quickly and turning off the vibrations provided by the linear resonant actuator. This combination of movable arm 126 actuation and linear resonant actuator activation can produce strong and realistic trigger haptics. To drop the gun and return to 'touch' mode, a user moves their thumb off the sensor 154 (i.e., drops a gun).

In any of the disclosed modalities, the voice coil actuator 174 can be used to simulate textures at the tip of the user's index finger. These textures can be provided in conjunction with, or separately from, the pinching/grasping, touching, or triggering modalities described above.

Automatic Determination of Haptic Interaction Modality

An advantage of at least certain disclosed controllers is that they can automatically determine what haptic interaction mode is intended by a user. The automatic determination can be made, at least in some cases, by detecting changes in the user's hand position. That is, when the user intends to pinch or grasp, the thumb is typically brought into a position where the thumb is proximate to, and typically abutting, the inner side 152. This proximity/contact can be determined by the sensor 154. When a user intends to fire a virtual weapon, the user's thumb is also typically proximate the thumb rest.

The intent to grasp/pinch versus trigger can be determined via software. For example, if the user is detected as holding a weapon in the computer-generated environment, as flag can be set such that the controller 100 is associated with a "triggering" mode when the user's thumb is proximate the sensor 154. If the user is not holding a weapon (or another object for which "triggering" has been specified), a flag can be set to indicate that the grasping/pinching (non-"trigger" mode) should be used when the user's thumb is proximate the sensor 154.

When the user's thumb is not proximate the sensor 154, software managing the computer-generated environment can determine that the user intends to engage in a "touch" haptic interaction modality.

Figure 4:
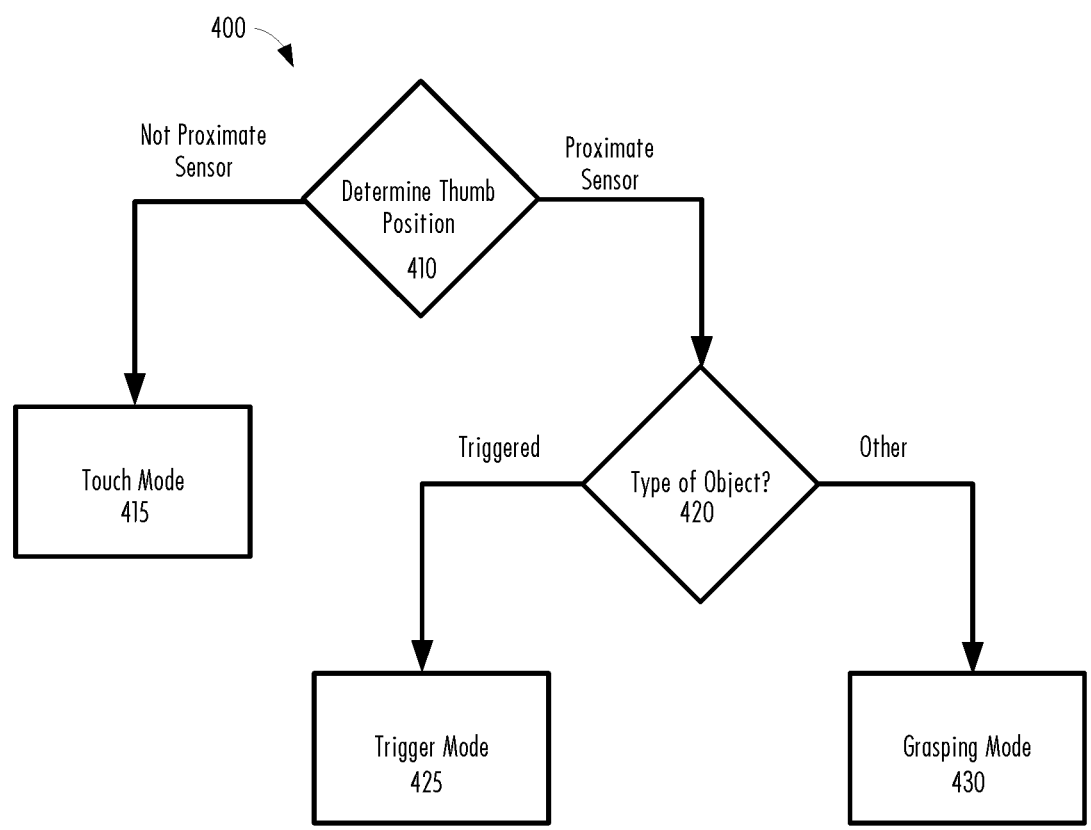
FIG. 4 is a flowchart of an example method for automatically determine a haptic interaction mode intended by a user.

FIG. 4 provides a flowchart of a method 400 for determining what interaction modality should be used based on signals measured by the sensor 154 and, at least in certain cases, settings associated with the computer-generated environment. At 410, signals from the sensor 154 are analyzed to determine the thumb position of the user. If the thumb is not proximate the sensor 154, the controller 100 is set to touch mode at 415. For example, a computing device managing a computer-generated environment can determine that the user intends a "touch" mode, and can interact with rendered objects accordingly (including by setting a "touch" mode or flag in software), and can send appropriate commands to the controller 100 to position the movable arm 126, or provide other haptic feedback.

If at 410 it is determined that the thumb is proximate the sensor 154, it is determined at 420 what type of object the user is grasping. If the user is grasping a gun or triggered device, the controller 100 is set to trigger mode at 425. For example, a computing device managing a computer-generated environment can determine that the user intends a triggering mode, and can interact with rendered objects accordingly (including by setting a "trigger" mode or flag in software), and can send appropriate commands to the controller 100 to position the movable arm 126, or provide other haptic feedback. If it is determined at 420 that the user is grasping an object other than a gun or a triggered device, the controller 100 is set to grasping mode at 430. For example, a computing device managing a computer-generated environment can determine that the user intends a grasping mode, and can interact with rendered objects accordingly (including by setting a "grasping" mode or flag in software), and can send appropriate commands to the controller 100 to position the movable arm 126, or provide other haptic feedback.

In some cases, decision 420 can be omitted, and the controller can be set between touching and grasping or touching and trigger modes depending on the proximity of the thumb to the sensor 154.

Controller with Rotatable Wheel of Haptic Elements

Figure 5:
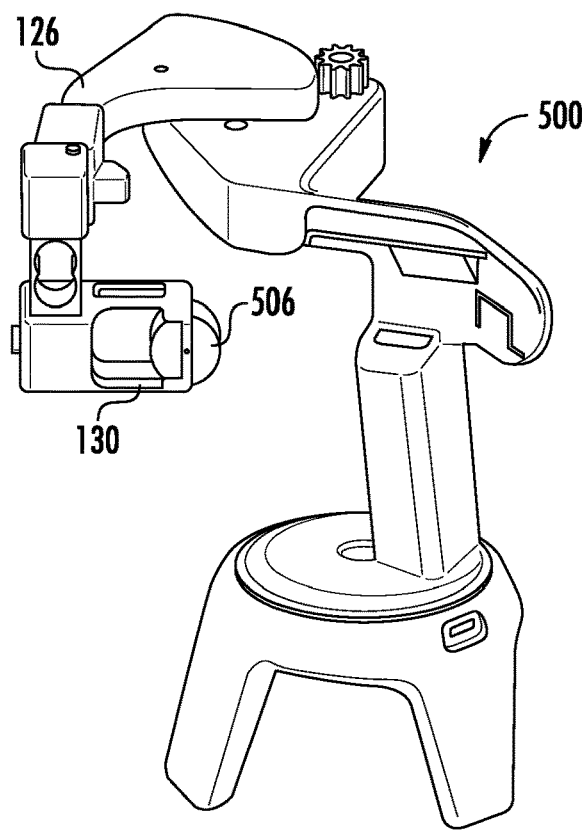
FIG. 5 is a perspective view of an example controller having a rotatable disc or wheel that includes one or more haptic elements.

The controller 100 of FIGS. 1 and 2 can be modified to provide different or additional functionality. For example, FIG. 5 illustrates a controller 500 that can be at least generally similar to the controller 100. Common components between the controller 100 and the controller 500 will not be further described.

Rather than the voice actuator coil 174, the controller 500 includes a rotatable disc 506 (or wheel) positioned at the free end 172 of the finger mount 130. The rotatable disc 506 can be positioned such that the radial surface of the disc is at least generally perpendicular to longitudinal axis of the movable arm 126, and the rotational axis of the disc is at least generally parallel to the longitudinal axis of the moveable arm. Thus positioned, the rotatable disc 506 can contact the inside surface of a user's index finger, with rotation of the disc providing the sensation of a surface sliding up or down, depending on whether the disc is rotating clockwise or counterclockwise and where it is positioned with respect to the fingertip.

In some cases, the disc or wheel can move in directions with respect to a user's finger other than, or in addition to, moving up and down. For example, the plane of the disc or wheel may be rotated about the radial axis of the plane such that the disc passes from a vertical orientation (e.g., the radial edge of the disc is directed upwardly and downwardly, the disc is contained in a vertical plane) to a horizontal orientation (e.g., the radial edge of the disc is directed leftwardly and rightwardly, the disc is contained in a horizontal plane), or angles therebetween. In some cases, the disc may be rotated in such a manner in 360 degrees, or a lesser number of degrees, such as 180 degrees or 90 degrees.

Figure 13A:
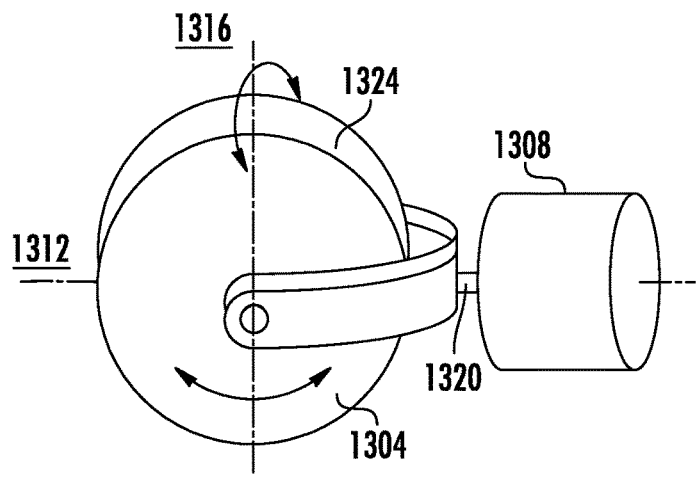
FIG. 13A is a perspective view of a rotatable disc or wheel that can be rotated about an axis perpendicular to its rotational axis.

Such an arrangement is depicted in FIG. 13A, which illustrates a rotatable disc or wheel 1304 coupled to an actuator 1308. The actuator 1308 (such as a servo motor or other type of motor) can rotate the disc or wheel 1304 about a (as shown) horizontal axis 1312. As shown, the actuator 1308 rotates the disc or wheel 1304 in a manner such that the rotational axis 1316 of the disc or wheel remains perpendicular to the axis 1312. Although the axis 1312 is shown as horizontal, in use the axis 1312 does not have to be horizontal relative to a reference point (e.g., a user, or a floor or other surface on which the user is standing or otherwise positioned). Further, in some aspects, the angle between the axes 1312, 1316 can vary (e.g., the disc or wheel 1304 can bend or pivot relative to the actuator 1308, including using a connector or arm 1320 that couples the disc or wheel to the actuator). In this manner, the disc or wheel 1304 can rotate about the axis 1312 such that the circumferential edge 1324 of the disc or wheel can simulate a larger variety of shear forces. Although not shown in FIGS. 13A-13C, the rotatable discs or wheels can be formed from a single haptic element, or can include multiple haptic elements, as described herein.

Figure 13B:
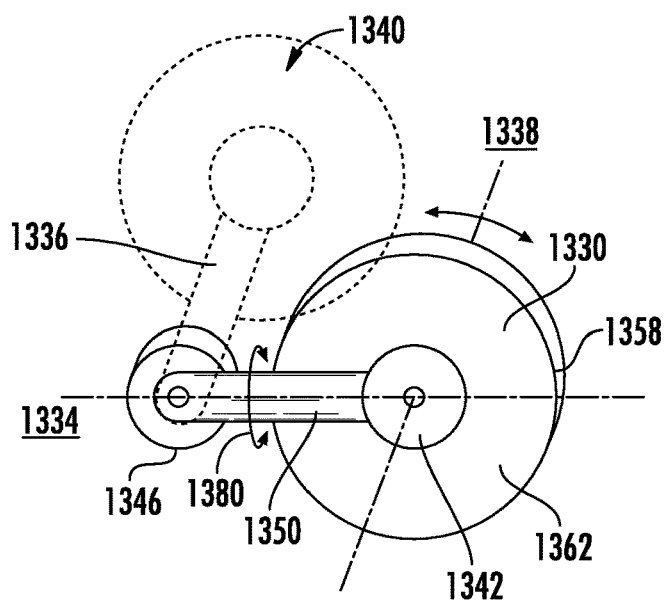
FIG. 13B is an elevational view of a rotatable disc or wheel that can be rotated about an axis perpendicular to its rotational axis.

FIG. 13B also illustrates a rotatable disc or wheel 1330 that can rotate about an axis 1334 (as indicated by arrow 1380) that is typically perpendicular to the axis of rotation 1338 of the disc or wheel. The disc or wheel 1330 is shown at the end of a mount 1336, with the remainder of a controller (e.g., a movable arm thereof) being generally indicates as 1340.

FIG. 13B illustrates an actuator (e.g., a servo motor or other type of motor) 1342 configured to rotate the disc or wheel 1330 about its rotational axis 1338. An actuator 1346 (e.g., a servo motor or other type of motor) is coupled to an arm or connector 1350 and rotates the arm about the axis 1334. As with the arrangement of FIG. 13A, in some cases, the actuator 1346 maintains the disc or wheel 1330 such that the axis 1338 is perpendicular to the axis 1334. In other cases, the actuator 1346, or another actuator, can bend or pivot such that the angle between the axes 1334, 1338 can be greater or less than ninety degrees, such as being between about 0 degrees and about 90 degrees (such as being between 0 degrees and 90 degrees).

Figure 13C:
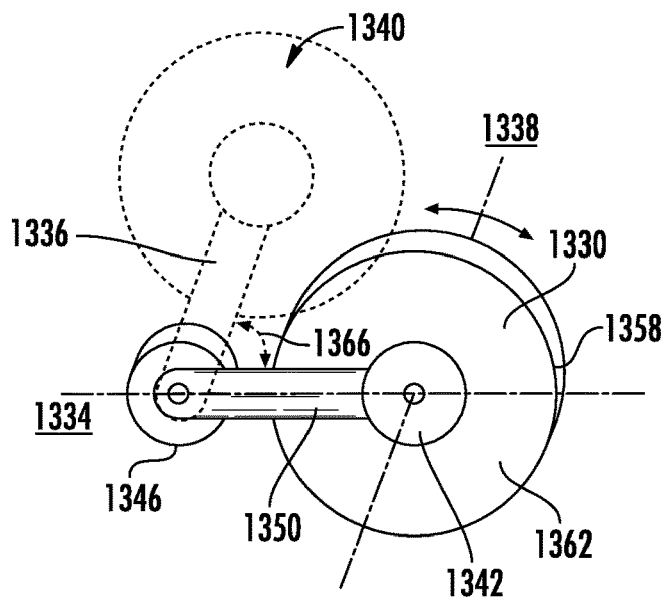
FIG. 13C is an elevational view of a rotatable disc or wheel that can be pivoted towards and away from a mount portion of a controller.

FIG. 13C illustrates an embodiment where the disc or wheel 1330 can be rotated such that its rotational axis 1338 rotates (e.g., bends or pivots) with respect to an axis 1354 through the vertical diameter of the disc or wheel, as indicated by arrow 1366. That is, the disc or wheel 1330 can rotate from a position where the circumferential edge 1358 of the disc contacts the user's finger to a position where an axial face (e.g., the opposite side of axial face 1362) of the disc contacts the user's finger, and positions therebetween. In some cases, the bending or pivoting motion (which can be accomplished via the actuator 1346 or another actuator) can be combined with rotation about the axis 1334. In other cases, the bending or pivoting motion can be used without rotation about the axis 1334.

Returning to FIG. 5, the rotatable disc 506 can be coupled to an actuating motor (not shown in FIG. 5) that is typically located on the finger mount 130. In some cases, the rotatable disc 506 can be translated laterally (perpendicularly) with respect to its rotational axis, such that the disc can be brought into varying degrees of contact with the surface of a user's finger (such as to simulate a hard or soft touch), including being spaced apart from the user's finger when it is not desired to simulate the user touching a surface. In other cases the rotatable disc 506 can be translated parallel to the disc 506 so that any angle of surface sliding can be felt.

As will be further described, the rotatable disc 506 can have a single haptic element (e.g., a textured area that can be placed into contact with the user's finger, where a texture can be any desired texture, including smooth textures). When it is desired to simulate the user touching a surface, the rotatable disc 506, if not already in contact with a user's finger, can be placed into contact with the user's finger. If it is desired to simulate shear forces (e.g., the user sliding their finger along a surface), the rotatable disc 506 can be rotated in the appropriate direction, and at the appropriate speed.

The rotatable disc 506 can include a plurality of haptic elements (e.g., the haptic elements 822 of FIG. 8), which can be used to simulate a variety of surfaces. When software controlling the computer-generated environment determines that the user is touching a surface, the software can cause the controller 500 to spin the rotatable disc 506, typically when the disc is not in contact with the user's finger, to place the appropriate haptic element in position to contact the user's finger when the rotatable disc is moved sufficiently proximate the user's finger. The rotatable disc 506 can be rotated to simulate shear forces if the user moves their hand or finger along the simulated surface. If the user moves to touch a surface with a different texture, the rotatable disc 506 can be moved away from the user's finger, rotated to place the correct haptic element proximate the user's finger, and the disc again translated to place the newly selected haptic element in contact with the user's finger.

In some cases, the circumferential area occupied by an individual haptic element may be insufficient to render shearing force. That is, for example, the user may drag their finger over a simulated surface that is longer than the circumferential length of the corresponding haptic element. In such cases, the rotational direction of the rotatable disc 506 can be reversed as the rotatable disc nears the end of a haptic element. Although the rotational direction of the rotatable disc 506 may be opposite of the direction of movement in the computer-generated environment, in many cases a user may not notice, or the difference may not be sufficient to negatively impact the user's experience.

Figure 6:
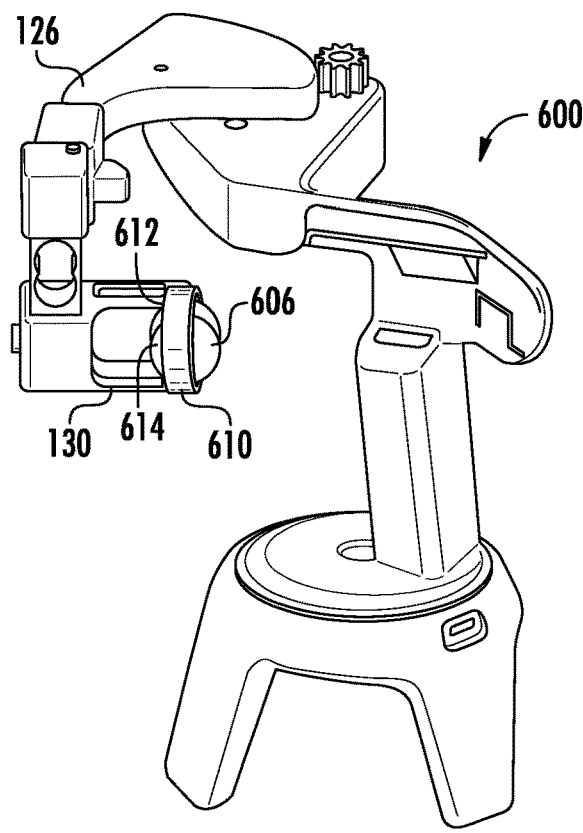
FIG. 6 is a perspective view of an example controller having two, perpendicularly disposed rotatable discs or wheels, each including one or more haptic elements.

FIG. 6 illustrates a controller 600 that can be a modified version of the controller 500. The controller 600 is generally similar to the controller 500, including a first rotatable disc (or wheel) 606 that can be at least generally analogous to the rotatable disc 506. However, the controller 600 additionally includes a second rotatable disc 610, or ring (or wheel), that is placed perpendicularly to the first rotatable disc 506. The second rotatable disc 610 is annular, defining a central opening that is sufficiently large to extend about the first rotatable disc 606, such that the first and second rotatable discs do not impinge on one another during operation.

The second rotatable disc 610 can include one or more haptic elements along the inner axial face 612 of the disc. Like the first rotatable discs 506, 606, the second rotatable disc 610 can be translated towards the load cell 170 and away from the load cell in order to place or remove the inner axial face 612 of the second rotatable disc from contact with a user's finger, or to vary the amount of pressure applied by the second rotatable disc to the user's finger. Rotation of the second rotatable disc 610 can be used to simulate side to side shearing forces on a user's finger.

As with the first rotatable discs, 506, 606, when the second rotatable disc 610 includes a plurality of haptic elements, the second rotatable disc 610 can be rotated, under the control of software managing the computer-generated environment, to place an appropriate haptic element proximate the user's fingertip. The second rotatable disc 610 can be rotated to simulate relative movement between the user's finger and a simulated surface, such as rotating the disc clockwise to simulate relative backward movement of the user's finger relative to the surface and rotating the disc counterclockwise to simulate relative forward movement of the user's finger relative to the surface.

In at least some embodiments, a distal portion 614 of the inner axial face 612 of the second rotatable disc 610 can be selectively placed in contact with a distal portion of a user's finger, and the first rotatable disc 606 can be selectively placed in contact with a more medial portion of the user's finger. The first and second rotatable discs 606, 610 can be placed individually in contact with the user's finger, or in combination, which can allow more complex shearing forces to be rendered.

In further aspects, the first and second rotatable discs 606, 610 can be translated proximally and distally, such as in a unit, to place either the first or second rotatable disc in contact with the user's finger. In this manner, a selected rotatable disc 606, 610, or both discs, can be placed into contact with a larger surface area of the user's fingertip, which in some cases can provide for more realistic haptic rendering. Or, the rotatable discs 606, 610 can be translated proximally or distally to place a selected amount of one or both discs in contact with a user's fingertip, which again can provide for more realistic haptic rendering in some scenarios.

Figure 7:
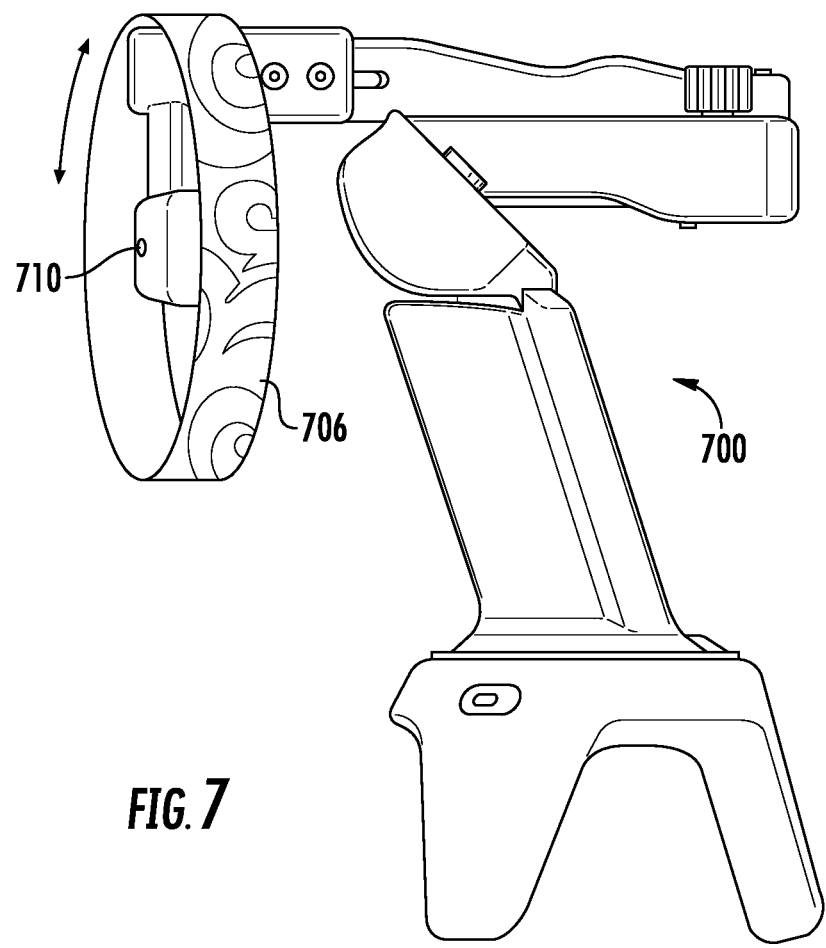
FIG. 7 is a perspective view of an alternative embodiment of a controller having a rotatable disc or wheel that includes one or more haptic elements.

FIG. 7 illustrates an alternative embodiment of a controller 700 having a rotatable disc, or ring (or wheel), 706. The rotatable disc 706 can define an opening that extends around the finger mount 130. The rotatable disc 706 can have an axial mounting pin 710 that can be coupled to the finger mount 130, or another portion of the controller 700 (such as, with reference to FIG. 1, the head portion 116, a portion of the moveable arm 126, or another location on the controller).

In some cases, the rotatable disc 706 can be rotated or otherwise actuated (such a being translated proximally and distally) by a motor or other actuator coupled to the mounting pin 710. In other cases, the mounting pin 710 can allow for rotation, and optionally translation, of the rotatable disc, but the disc actuator can be placed in another location. For example, a rotatable wheel (not shown) can extend from the upper surface of the moveable arm 126 (e.g., from the pivotable member 166) and be in frictional contact with a lower (or inner) radial surface of the disc. The rotatable wheel can maintain the rotatable disc 706 in a desired position, or can rotate the disc clockwise or counterclockwise, at least generally described for the rotatable disc 506, 606, 610 of FIGS. 5 and 6.

Although the rotatable discs, rings, and wheels have been described as such, it should be appreciated that a rotatable disc, ring, or wheel may have a shape that is not strictly circular, or even arcuate. A rotatable object may have an elliptical shape, which can, for example assist in coupling a rotatable disc to a controller, including maintain appropriate spacing (such as to avoid impingement) from other controller components, and to allow the rotatable disc to contact a user's finger. Also, in place of a disc, ring, or wheel, a rotatable object can have a more three-dimensional shape, such a spherical or ellipsoidal shapes.

Figure 8:
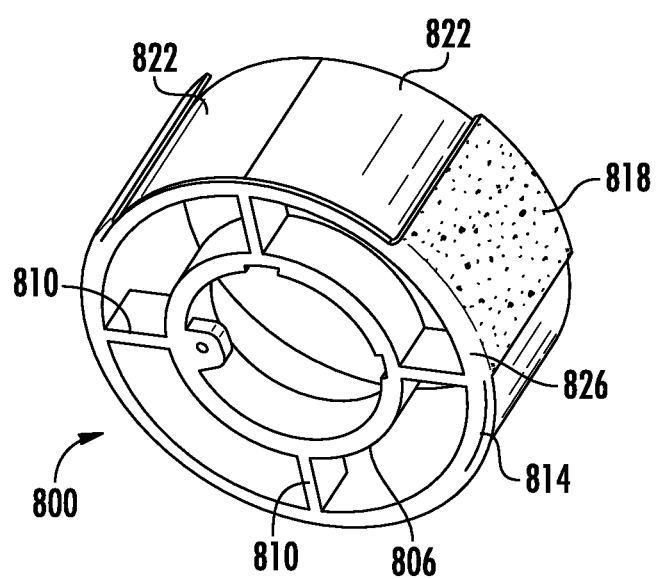
FIG. 8 is a perspective view of an example rotatable disc or wheel having a plurality of haptic elements.

FIG. 8 illustrates an example rotatable disc, or wheel, 800 that can be used in certain aspects of the disclosed technologies. The rotatable disc 800 can include a central annular hub 806 with a plurality of radially extending spokes 810 connected to an outer ring 814 having an outer, circumferential radial face 818. The rotatable disc 800 can include a plurality of haptic elements 822, as shown in FIG. 8. However, in some cases, the rotatable disc can have a single haptic element 822.

As used herein, a haptic element 822 refers to a surface that can provide a tactile sensation to a user in physical contact with the haptic element. For example, the tactile sensation can be provided by placing a haptic element 822 in physical contact with a user's fingertip, although other parts of the body can be contacted by appropriately adapting a device on which the rotatable disc 800 is mounted. Haptic elements 822 that are "different" than one another can be different in any manner or degree, so long as there is a perceptible tactile different to a user. Haptic elements 822 can be formed from different materials, such as having materials with different surface roughness, friction, resiliency, or other surface characteristics.

Haptic elements 822 can be more complex. For example, haptic elements 822 can include mechanical or electromechanical elements, such as buttons, switches, keys, dials, knobs, pointing devices (including analog stick controllers) and the like. In some cases, the haptic elements 822 can function simply as haptic elements providing tactile feedback to a user. In other cases, the haptic elements 822 can serve as input devices for a computer-generated environment (e.g., a switch can cause an action to occur in the computer-generated environment). In the controllers 500, 600, 700 the rotatable discs 506, 606, 706 typically take the place of the voice coil actuator 174 of the controller 100. In such cases, a voice coil actuator can be included as a haptic element 822 on a rotatable disc, which can be beneficial if tactile sensations are to be rendered to a user that are not provided by another, specific haptic element of the disc.

In at least some cases, a rotatable disc 800 can include haptic elements that are selected for a particular computer-generated environment. For example, for a card game scenario, the haptic elements 822 might include a felt material to simulate the surface of a card table, a hard plastic material to simulate gaming chips or tokens, and a paper material to simulate playing cards. For an aircraft simulator, the haptic elements 822 might include various knobs, switches, dials, and the like that might be used in a simulated airplane cockpit. In at least some aspects, rotatable discs 800 used with a particular controller (including the controller 100) can be interchangeable. For example, a user may change rotatable discs 800 depending on the nature of a particular computer-generated environment with which they will be interacting.

While haptic elements 822 are shown as disposed on the radial face 818 of the rotatable disc 800, the haptic elements 822 may be disposed on other, or additional, locations on the disc. For example, as described above, in some cases a user's finger (or other body part) may be placed into contact with an axial face 826 of the outer annular ring 814.

When multiple haptic elements 822 are included in a rotatable disc 800, the haptic elements may have the same or different surface areas. That is, one haptic element 822 may occupy a larger circumferential portion of the radial face 818 than another haptic element. In some cases, the same haptic element 822 can be located at multiple sections of the rotatable disc, if desired. Taking the example of the "card table" simulation described above, a "plastic chip" haptic element 822 may be disposed between two "felt" elements.

FIG. 8 illustrates haptic elements 822 located in a single circumferential line. In other implementations, a rotatable disc 800 can include haptic elements 822 disposed in a plurality of circumferential lines along the outer radial surface 818 (or another surface, in other embodiments), where the circumferential lines are adjacent or spaced apart from one another. For example, a first haptic element 822 may be disposed about all or a portion of a first circumferential line, and a second haptic element may be disposed about all or a portion of a second circumferential line.

In use, a user can manually adjust the position of the rotatable disc 800 so that a desired circumferential line of haptic elements 822 can be placed into contact with the user's finger. Or, the rotatable disc 800 can be translated, such as axially proximally and distally, by a suitable actuating mechanism of a controller with which the disc is used, and optionally rotated, such that an appropriate circumferential line, and optionally the appropriate circumferential position, of the rotatable disc may be placed into contact with the user's finger.

Including multiple circumferential lines of haptic elements 822 can provide a number of benefits. For example, the use of multiple circumferential lines may allow a single haptic element to have a larger surface area, which can allow for a greater duration of shearing forces to be rendered. The use of multiple circumferential lines of haptic elements 822 can also allow a greater number of haptic elements to be included on a single rotatable disc, which can provide a greater variety of tactile sensations to the user without requiring the user to exchange the rotatable disc 800 for another.

Although FIGS. 5-7 show a rotatable disc 800 (i.e., discs 506, 606, 706, 710) in use with various controllers (500, 600, 700) that are generally analogous to the controller 100, the disclosed rotatable discs may be used with any suitable controller, which may or may not provide additional haptic functionality. For example, the rotatable disc 800 can be mounted at the end of a shaft, where the disc is rotatable by an actuator formed in the shaft. The shaft can define a finger rest for receiving a user's finger, such as their index finger. A second actuator can be disposed in the shaft and configured to move the rotatable disc 800 towards, and away from, the user's finger, as well as optionally control the amount of pressure exerted on the user's finger by the disc.

Methods for Creating and Transferring Interaction Representations

Figure 9:
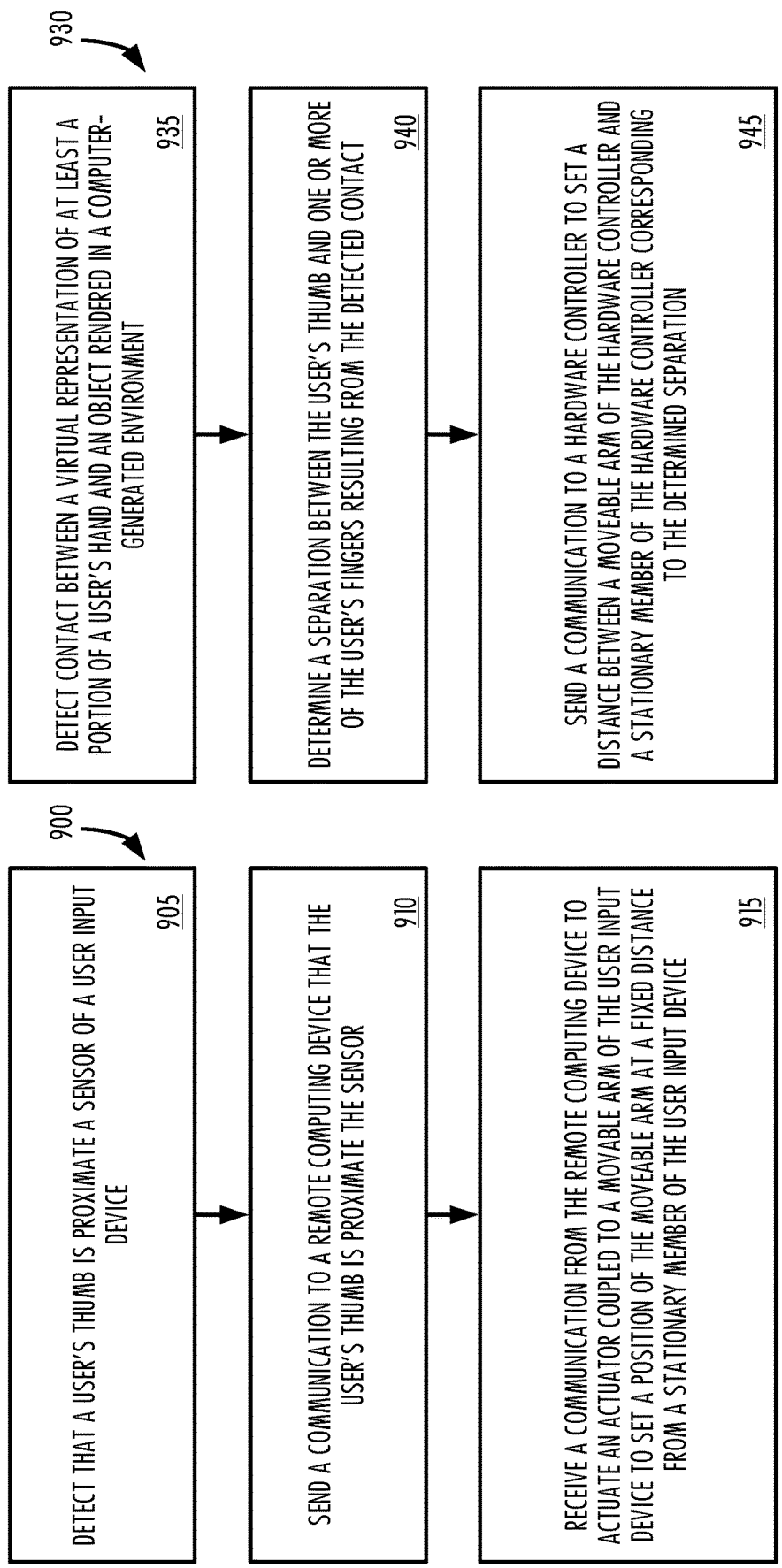
FIG. 9A is a flowchart of an example method of setting a position of a moveable arm of a hardware user input device relative to a stationary member of the device in response to a communication from a remote computing device.
FIG. 9B is flowchart of an example method of setting a position of a moveable arm of a hardware controller relative to a stationary member of a controller corresponding to a detected contact between a virtual representation of a user's hand and a rendered object.

FIG. 9A presents a flowchart of an example method 900 for setting a position of a moveable arm of a user input device relative to a stationary member of the user input device. At 905, it is detected that a user's thumb is proximate a sensor of the user input device. A communication is sent at 910 to a remote computing device that the user's thumb is proximate the sensor. At 915, a communication is received from the remote computing device to actuate an actuator coupled to the moveable arm to set a position of the moveable arm at a fixed distance from a stationary member of the user input device.

FIG. 9B presents a flowchart of an example method 930 for setting an angle between a moveable arm of a hardware controller and a stationary member of the hardware controller. At 935, it is detected that contact has been made between a virtual representation of at least a portion of a user's hand and an object rendered in a computer-generated environment. A separation is determined, at 940, between the user's thumb and one or more of the user's fingers resulting from the detected contact. At 945, a communication is sent to the hardware controller to set a distance between the moveable arm and the stationary member corresponding to the determined separation.

Computing Systems

Figure 10:
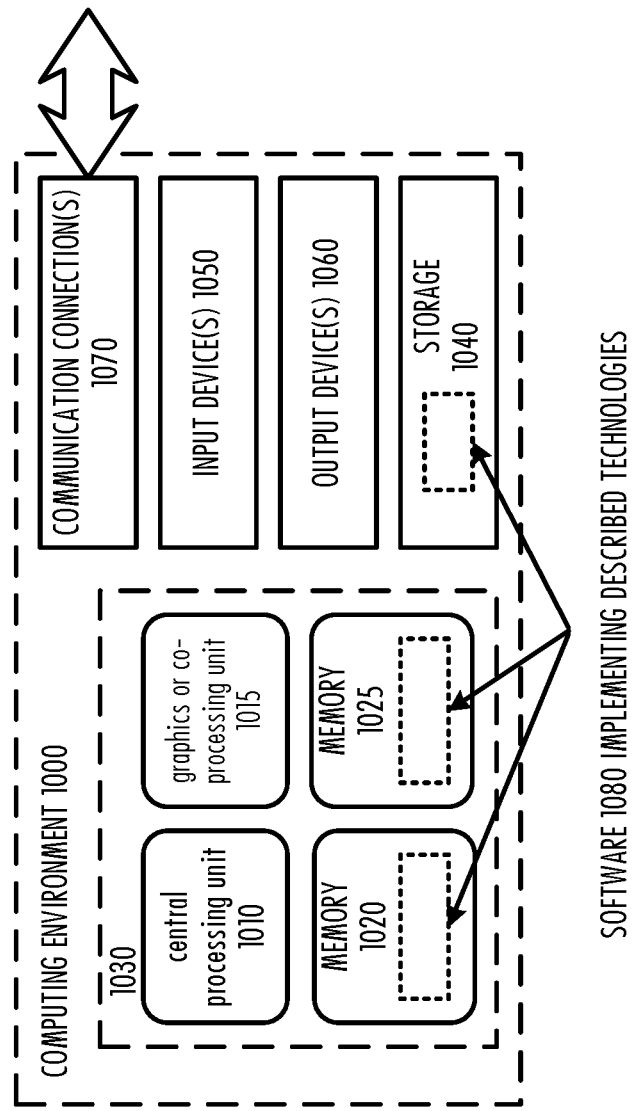
FIG. 10 is a diagram of an example computing system in which some described embodiments can be implemented.

FIG. 10 depicts a generalized example of a suitable computing system 1000 in which the described technologies may be implemented. The computing system 1000 is not intended to suggest any limitation as to scope of use or functionality, as the technologies may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), nonvolatile memory (e.g., ROM, EEPROM, flash memory, etc.), or some combination of the two, accessible by the processing unit(s). The memory 1020, 1025 stores software 1080 implementing one or more technologies described herein, in the form of computer-executable instructions suitable for execution by the processing unit(s), such as instructions for generating or managing a computer-generated environment and receiving communications from, and providing communications to, a disclosed haptic-feedback controller. The instructions can be executed on the processing units 1010 and/or 1015.

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information and which can be accessed within the computing system 1000. The storage 1040 stores instructions for the software 1080 implementing one or more technologies described herein.

The input device(s) 1050 may be a touch input device such as a keyboard, mouse, pen, or trackball, a voice input device, a scanning device, or another device that provides input to the computing system 1000. In some cases, a disclosed controller can serve as an input device 1050. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity, including a disclosed controller. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computer device. In general, a computing system or computer device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into one or more programs, such as one or more lines of code in one or more larger programs, or a general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 11:
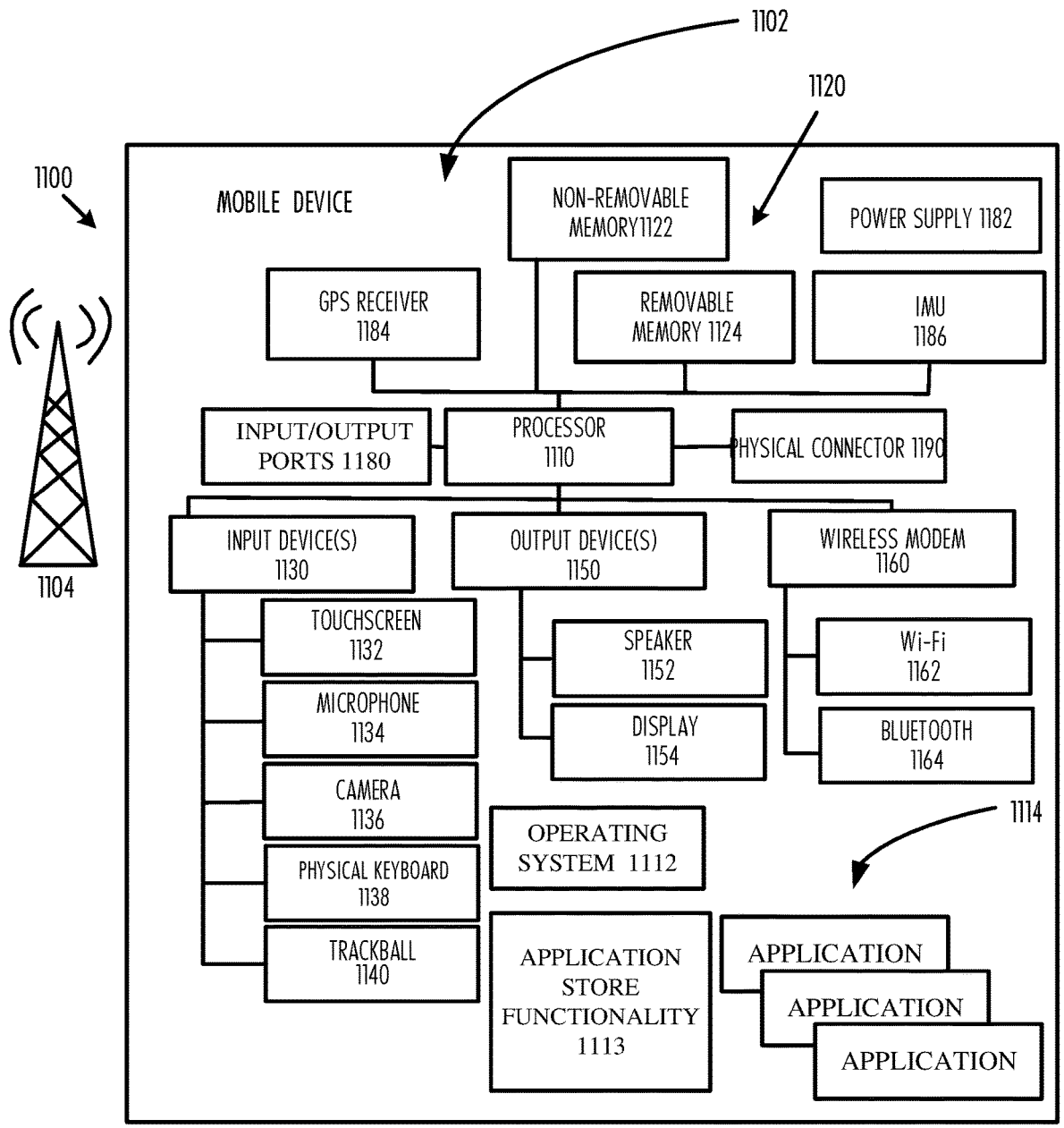
FIG. 11 is an example mobile device that can be used in conjunction with the technologies described herein.

FIG. 11 is a system diagram depicting an example mobile device 1100 including a variety of optional hardware and software components, shown generally at 1102. Any components 1102 in the mobile device can communicate with any other component, although not all connections are shown, for ease of illustration. The mobile device can be any of a variety of computer devices (e.g., cell phone, smartphone, handheld computer, Personal Digital Assistant (PDA), etc.) and can allow wireless two-way communications with one or more mobile communications networks 1104, such as a cellular, satellite, or other network.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs can include common mobile computing applications (e.g., email applications, calendars, contact managers, web browsers, messaging applications), or any other computing application. Functionality 1113 for accessing an application store can also be used for acquiring and updating application programs 1114.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a disclosed controller, a touchscreen 1132, microphone 1134, camera 1136, physical keyboard 1138 and/or trackball 1140 and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

The input devices 1130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 can comprise speech-recognition software as part of a voice user interface that allows a user to operate the device 1100 via voice commands. Further, the device 1100 can comprise input devices and software that allows for user interaction via a user's spatial gestures, such as detecting and interpreting gestures to provide input to a gaming application. The device 1100 can use a disclosed controller as an input device, in some aspects.

A wireless modem 1160 can be coupled to an antenna (not shown) and can support two-way communications between the processor 1110 and external devices, including a disclosed controller, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a Global Positioning System (GPS) receiver, an inertial measurement unit (IMU) 1186 (or one or more components thereof, such as a magnetometer, an accelerometer, or a gyroscope, or similar types of sensors), and/or a physical connector 1190, which can be a USB port, IEEE 1394 (FireWire) port, and/or RS-232 port. The illustrated components 1102 are not required or all-inclusive, as any components can be deleted and other components can be added.

Cloud-Supported Environment

Figure 12:
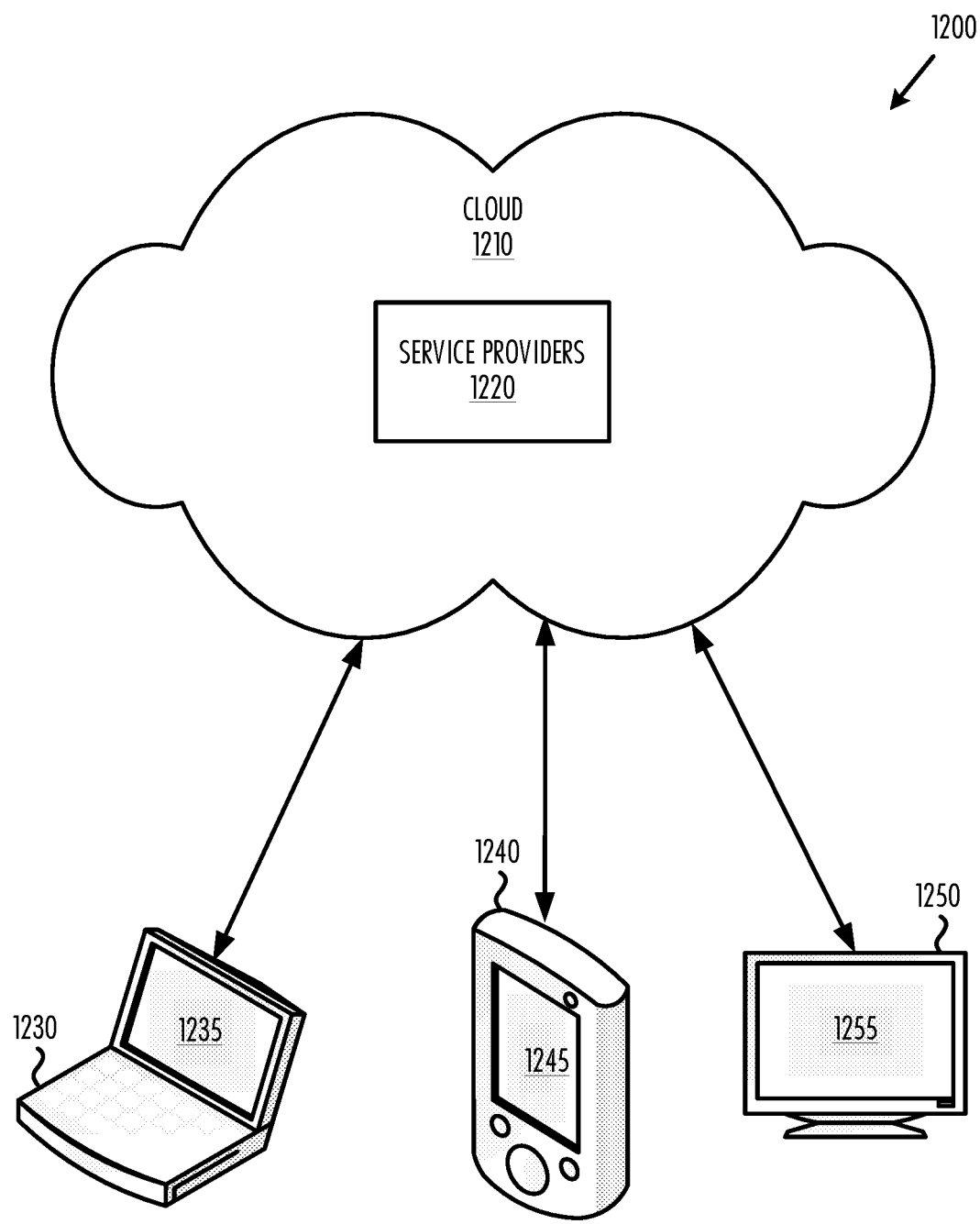
FIG. 12 is an example cloud-support environment that can be used in conjunction with the technologies described herein.

FIG. 12 illustrates a generalized example of a suitable cloud-supported environment 1200 in which described embodiments, techniques, and technologies may be implemented. In the example environment 1200, various types of services (e.g., computing services) are provided by a cloud 1210. For example, the cloud 1210 can comprise a collection of computer devices, which may be located centrally or distributed, that provide cloud-based services to various types of users and devices connected via a network such as the Internet. The implementation environment 1200 can be used in different ways to accomplish computing tasks. For example, some tasks (e.g., processing user input and presenting a user interface) can be performed on local computer devices, while other tasks (e.g., storage of data to be used in subsequent processing) can be performed in the cloud 1210.

In example environment 1200, the cloud 1210 provides services for connected devices 1230, 1240, 1250 with a variety of screen capabilities. Connected device 1230 represents a device with a computer screen 1235 (e.g., a mid-size screen). For example, connected device 1230 could be a personal computer such as desktop computer, laptop, notebook, netbook, or the like. Connected device 1240 represents a device with a mobile device screen 1245 (e.g., a small size screen). For example, connected device 1240 could be a mobile phone, smart phone, personal digital assistant, tablet computer, and the like.

Connected device 1250 represents a device with a large screen 1255. For example, connected device 1250 could be a television screen (e.g., a smart television) or another device connected to a television (e.g., a set-top box or game console) or the like.

One or more of the connected devices 1230, 1240, 1250 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services can be provided by the cloud 1210 through service providers 1220, or through other providers of online services (not depicted). For example, cloud services can be customized to the screen size, display capability, and/or touchscreen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computer device (i.e., any available computer device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 10, computer-readable storage media include memory 1020 and 1025, and storage 1040. By way of example and with reference to FIG. 10, computer-readable storage media include memory and storage 1020, 1022, and 1024. The term computer-readable storage media does not include signals and carrier waves. In addition, the term computer-readable storage media does not include communication connections, such as 1070, 1060, 1062, and 1064.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A controller for a computing device, comprising:
   a stationary member having an inner surface and an outer surface, the inner surface configured to receive a user's thumb, wherein the stationary member defines an arm mount extending from an outer side of a head portion of the stationary member;
   a movable arm pivotably coupled to the arm mount;
   a mount configured to receive one or more fingers of the user;
   a processor configured to receive communications from a remote computing device to set a position of the movable arm relative to the stationary member; and
   an actuator coupled to the moveable arm and configured to move the moveable arm relative to the stationary member in accordance with commands provided by the processor.

2. The controller of claim 1, wherein the stationary member comprises a proximity sensor disposed on the inner surface and configured to sense whether the user's thumb is proximate the sensor.

3. The controller of claim 1, wherein the stationary member comprises an analog stick.

4. The controller of claim 1, wherein the controller comprises a positional tracking member.

5. The controller of claim 1, further comprising a shaft, the stationary member extending from the shaft.

6. The controller of claim 5, further comprising a linear resonant actuator disposed in the shaft.

7. The controller of claim 1, further comprising a haptic feedback member coupled to the mount.

8. The controller of claim 7, wherein the haptic feedback member comprises a voice actuator coil.

9. The controller of claim 1, further comprising a pivotable member coupled intermediate a distal end of the movable arm and the mount.

10. The controller of claim 1, further comprising a force sensor coupled to the moveable arm and the mount.

11. The controller of claim 1, further comprising: a rotatable object configured to be placed proximate an inner portion of the mount, the rotatable object comprising one or more haptic elements; a rotational actuator configured to rotate the rotatable object about the rotational axis of the rotatable object; and a translational actuator configured to move the rotatable object inwardly and outwardly relative to the inner portion of the mount.

12. The controller of claim 11, wherein the rotatable object comprises a plurality of haptic elements disposed circumferentially about an outer surface of the rotatable object.

13. The controller of claim 1, wherein the mount is coupled to a distal end of the moveable arm.

14. The controller of claim 1, wherein the stationary member comprises a proximity sensor disposed on the inner surface and configured to sense whether the user's thumb is proximate the sensor, the controller further comprising:
   a pivotable member coupled intermediate a distal end of the movable arm and the mount; and
   a force sensor in communication with the moveable arm and configured to sense a force applied by a user to the moveable arm.

15. A method, implemented by a processor of a hardware user input device, comprising:
   detecting that a user's thumb is proximate a proximity sensor of the user input device;
   sending a communication to a remote computing device in communication with the hardware user input device indicating that the user's thumb is proximate the proximity sensor; and
   receiving a communication from the remote computing device to actuate an actuator coupled to a moveable arm of the user input device to set a position of the moveable arm at a fixed distance from a stationary member of the user input device, wherein the stationary member defines an arm mount extending from an outer side of a head portion of the stationary member and the moveable arm is coupled to the arm mount.

16. The method of claim 15, further comprising: detecting that a force applied by the user to a pivotable member of the moveable arm exceeds a threshold; decreasing an angle between the moveable arm and the stationary member; and increasing the angle between the moveable arm to the stationary member to return the moveable arm to a position of the moveable arm before the applied force exceeded the threshold.

17. One or more computer-readable media comprising computer-executable instructions that when executed cause a computing system to perform processing to provide haptic feedback through a hardware controller to a user, the processing comprising:
   detecting contact between a virtual representation of at least a portion of a user's hand and an object rendered in a computer-generated environment;
   determining a separation between the user's thumb and one or more of the user's fingers resulting from the detected contact; and
   sending a communication to the hardware controller to set a distance between a moveable arm of the hardware controller and a stationary member of the hardware controller corresponding to the determined separation, wherein the stationary member defines an arm mount extending from an outer side portion of a head portion of the stationary member, the moveable arm being coupled to the arm mount.

18. The method of claim 17, further comprising: receiving a communication from the hardware controller indicating that the user's thumb is proximate a thumb rest portion of the stationary member; and determining that the user intends to perform a grasping action.

19. The method of claim 18, the method further comprising:
   determining that an object grasped by a user is associated with a triggering mode; and sending a communication to the hardware controller to carry out a triggering action.

20. The method of claim 17, the method further comprising: receiving a communication from the hardware controller indicating that the user's thumb is not proximate a thumb rest portion of the stationary member; and determining that the user intends to perform a touching action.

* * * * *